(12) United States Patent
Beck et al.

(10) Patent No.: US 11,618,318 B2
(45) Date of Patent: Apr. 4, 2023

(54) TRANSMISSION HAVING A TORQUE VECTORING SUPERPOSITION UNIT

(71) Applicant: ZF FRIEDRICHSHAFEN AG, Friedrichshafen (DE)

(72) Inventors: Stefan Beck, Eriskirch (DE); Matthias Reisch, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/621,364

(22) PCT Filed: Mar. 5, 2020

(86) PCT No.: PCT/EP2020/055780
§ 371 (c)(1),
(2) Date: Dec. 21, 2021

(87) PCT Pub. No.: WO2020/259874
PCT Pub. Date: Dec. 30, 2020

(65) Prior Publication Data
US 2022/0355663 A1 Nov. 10, 2022

(30) Foreign Application Priority Data
Jun. 28, 2019 (DE) ..................... 10 2019 209 461.9

(51) Int. Cl.
*F16H 48/36* (2012.01)
*B60K 23/04* (2006.01)
(Continued)

(52) U.S. Cl.
CPC ................ *B60K 23/04* (2013.01); *B60K 1/00* (2013.01); *B60K 17/165* (2013.01);
(Continued)

(58) Field of Classification Search
CPC ...... F16H 48/36; F16H 37/0813; F16H 48/10; F16H 2048/368; F16H 2048/106;
(Continued)

(56) References Cited

U.S. PATENT DOCUMENTS 7,393,296 B2 * 7/2008 Kano ...................... F16H 3/728
475/5
8,012,057 B2 9/2011 Meixner
2006/0247081 A1 11/2006 Yamauchi et al.

FOREIGN PATENT DOCUMENTS

DE 102011079975 1/2013
DE 102013202381 8/2014
(Continued)

OTHER PUBLICATIONS

Office Action for the corresponding German Patent Application No. 10 2019 209 461.9.

*Primary Examiner* — Justin Holmes
(74) *Attorney, Agent, or Firm* — Cozen O'Connor

(57) ABSTRACT

A transmission having an input and first and second output shafts and first and second planetary gear sets. Torque introduced via the input shaft is distributed to the two output shafts in a defined ratio. An element of the first planetary gear set is connected to another element of the second planetary gear set and an element of the second planetary gear set is secured to a rotationally fixed component. A torque vectoring superposition unit has a third planetary gear set. A first element of the third planetary gear set is rotationally fixed to a linking shaft. A second element of the third planetary gear set is connected to a machine rotor. A third element of the third planetary gear set is rotationally fixed to an element of the second planetary gear set, which is fixed to the first output shaft.

11 Claims, 32 Drawing Sheets

(51) Int. Cl.
*B60K 1/00* (2006.01)
*B60K 17/16* (2006.01)
*B60K 17/356* (2006.01)
*F16H 48/10* (2012.01)

(52) U.S. Cl.
CPC .......... *B60K 17/356* (2013.01); *F16H 48/10* (2013.01); *F16H 48/36* (2013.01); *B60K 2001/001* (2013.01); *B60K 2023/043* (2013.01); *B60Y 2400/73* (2013.01); *F16H 2048/106* (2013.01); *F16H 2048/364* (2013.01)

(58) Field of Classification Search
CPC ......... F16H 2048/364; F16H 2048/104; B60K 17/165; B60K 2001/001; B60K 23/04; B60K 5/02; B60K 2023/043; B60K 1/00; B60K 17/356; B60Y 2400/73
See application file for complete search history.

(56) References Cited

FOREIGN PATENT DOCUMENTS

| | | | |
|---|---|---|---|
| DE | 102013202382 | 8/2014 | |
| DE | 102013214095 | 1/2015 | |
| DE | 102014214326 | 1/2016 | |
| DE | 102017111036 | 11/2018 | |
| DE | 102017220170 B3 * | 3/2019 | ............... B60K 1/00 |
| DE | 102019214986 A1 * | 4/2021 | ............... B60K 1/02 |
| JP | 2017053430 | 3/2017 | |
| WO | WO-2014191091 A1 * | 12/2014 | ........... B60K 17/165 |

\* cited by examiner

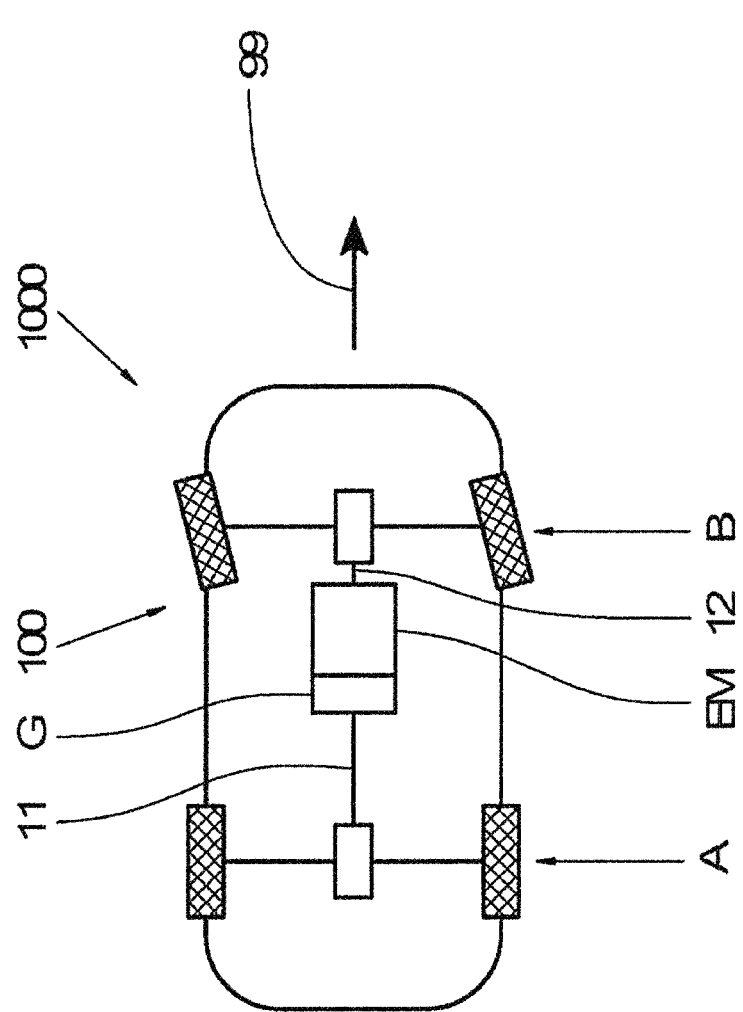

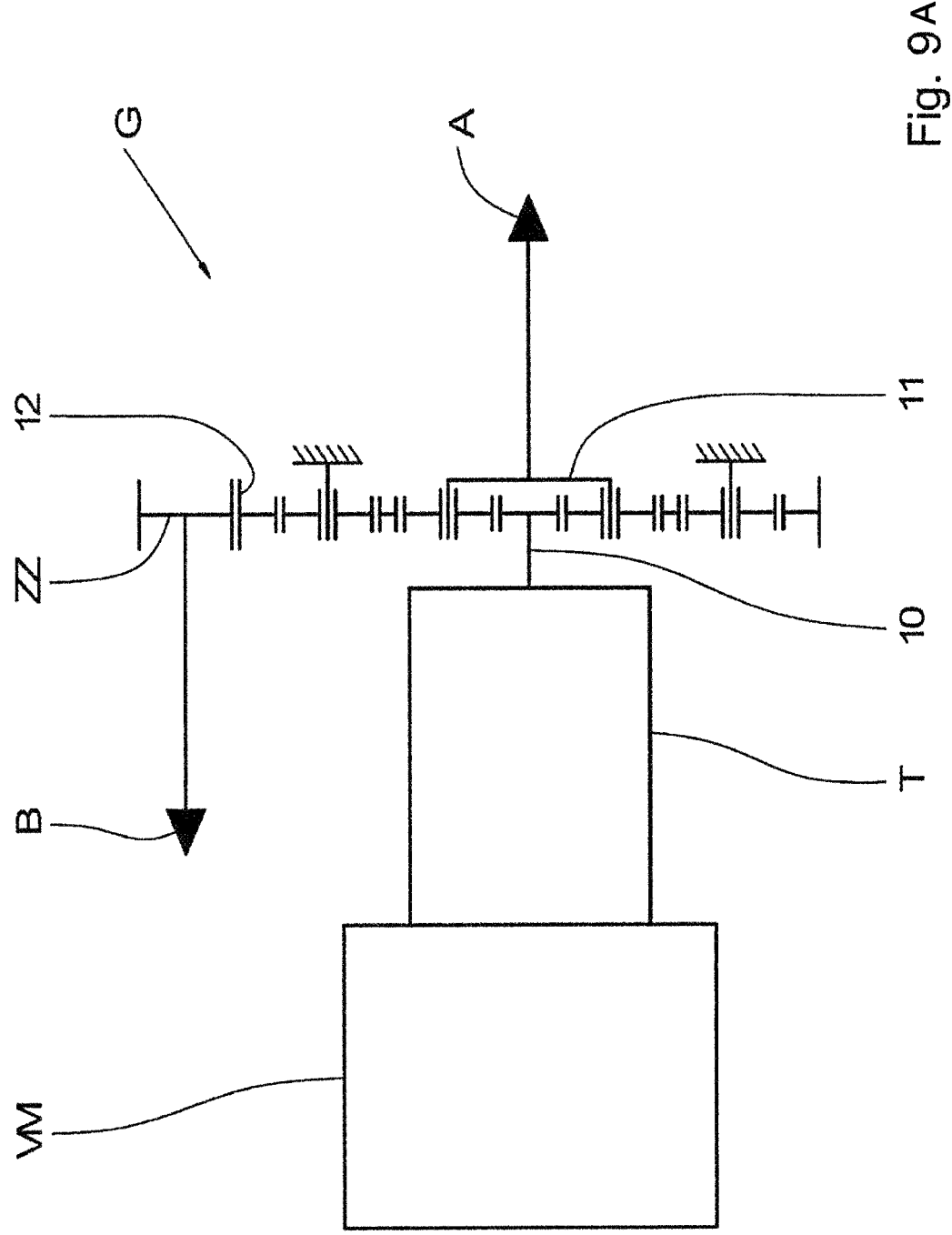

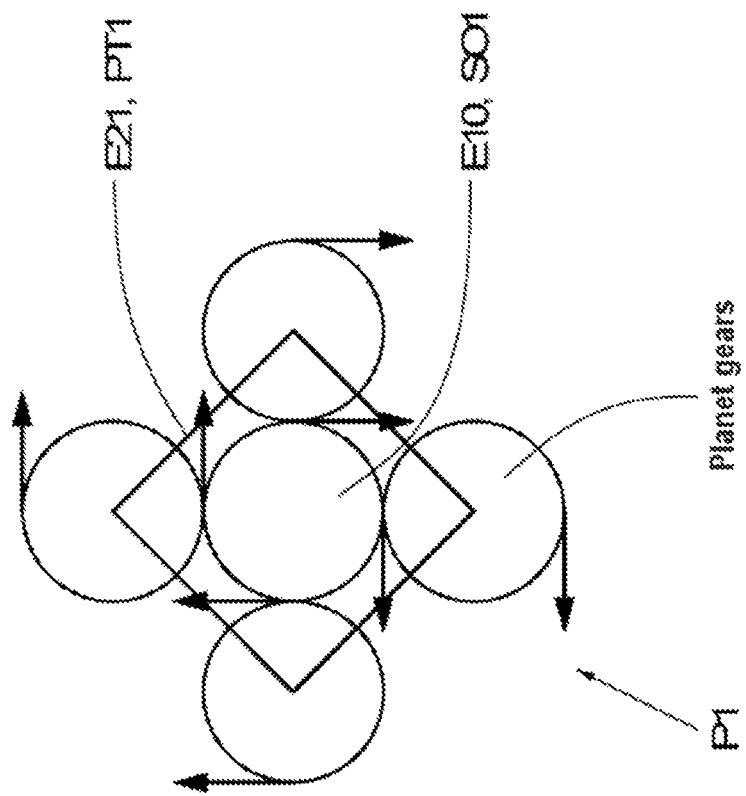
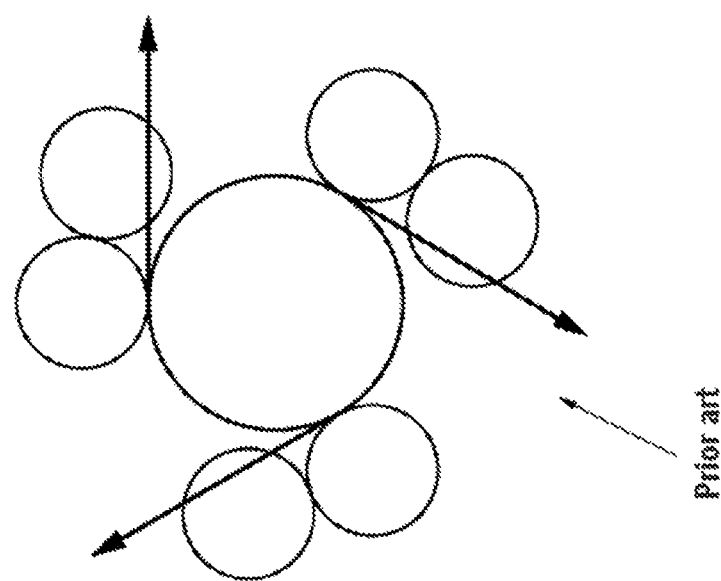
Fig. 15

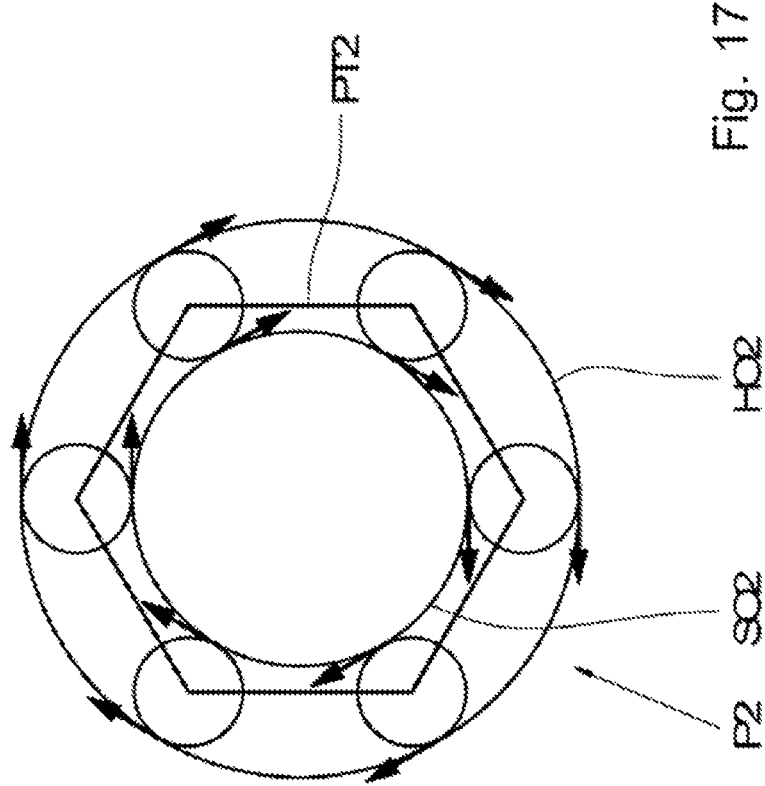
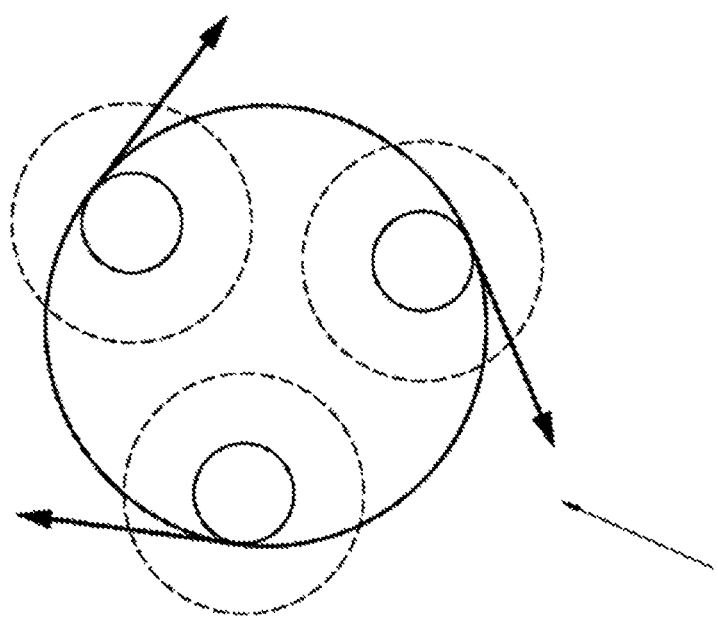
Fig. 17

| Figure | P1 | P2 | Calculation rule |
|---|---|---|---|
| 2, 3 | minus | minus | $i_{02} = \dfrac{1}{i_{01}} - 1$ |
| 8 | minus | minus | $i_{02} = \dfrac{1}{i_{01}} - 1$ |
| 9 | minus | minus | $i_{02} = i_{01} - 1$ |
| 4 | plus | minus | $i_{02} = \dfrac{1}{1 - i_{01}} - 1$ |
| 6 | minus | plus | $i_{02} = 2 - \dfrac{1}{i_{01}}$ |
| 5 | plus | plus | $i_{02} = 2 + \dfrac{1}{i_{01}} - 1$ |

Fig. 19

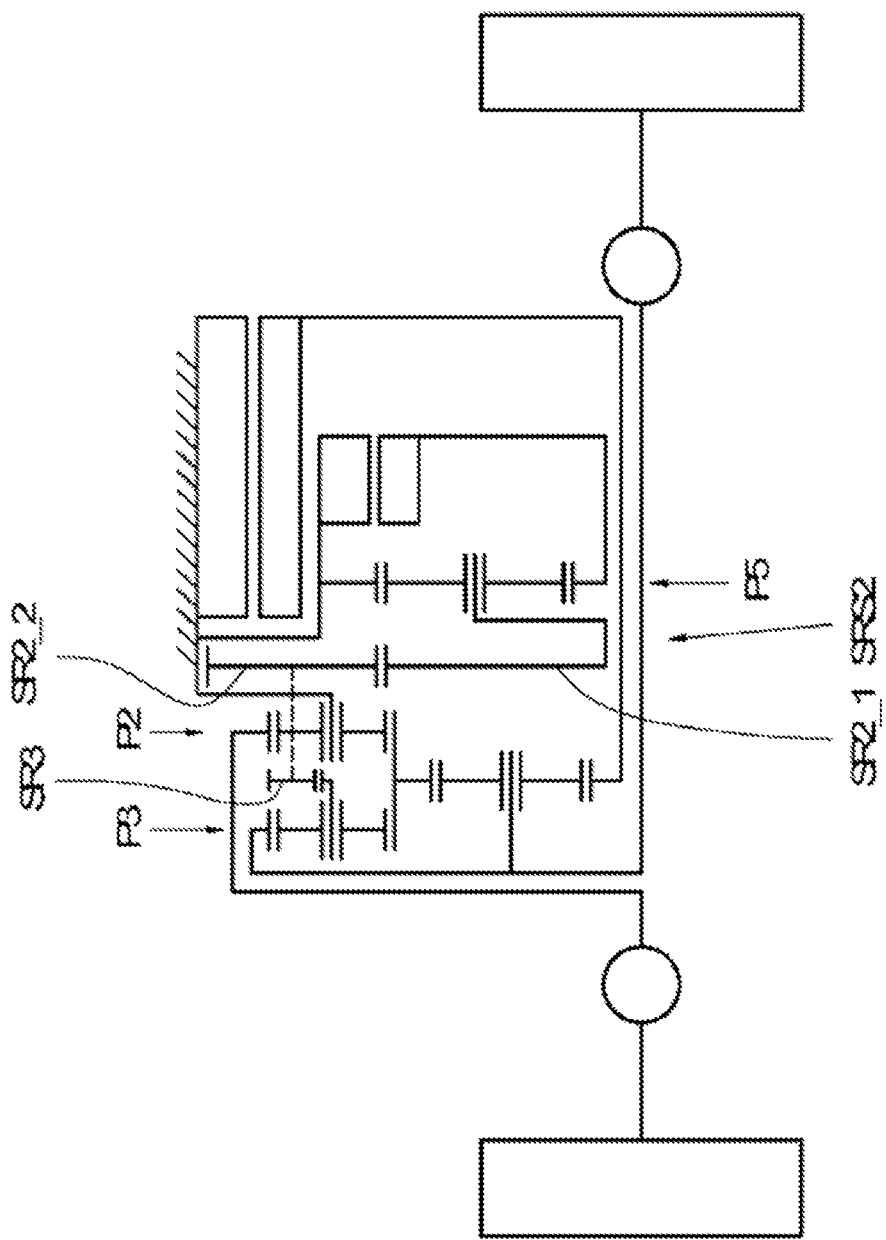

TRANSMISSION HAVING A TORQUE VECTORING SUPERPOSITION UNIT

CROSS REFERENCE TO RELATED APPLICATIONS

This is a U.S. national stage of Application No. PCT/EP2020/055780 filed Mar. 5, 2020. Priority is claimed on German Application No. DE 10 2019 209 461.9 filed Jun. 28, 2019 the content of which is incorporated herein by reference.

BACKGROUND OF THE INVENTION

1. Field of the Invention

The disclosure relates to a transmission having a torque vectoring superposition unit. The disclosure also relates to a drivetrain and a vehicle.

2. Description of Related Art

A conventional differential transmission makes cornering possible by allowing different rotational speeds of the two drive wheels. The conventional transmission transmits the drive torque equally to both wheels (open differential). It is disadvantageous that that wheel that has the better grip only has as much traction as that which is situated on slippery ground or which is lightly loaded during cornering. A differential lock can be used to increase traction and improve driving dynamics, which differential lock partially connects the two drive wheels to one another by way of friction. With adjustable differential locks, the cornering ability of an open differential can be combined with the improved traction of a locking differential. The differential transmission is also known as a differential or differential compensating transmission.

It is also known from the prior art for differential transmissions that have a torque superposition function, so-called torque vectoring transmissions (TV transmissions), to be provided for sports passenger motor vehicles. Such a TV transmission allows wheel-specific distribution of torque between the two wheel-side output shafts of the differential transmission. Such a system can generate the desired torque in every driving situation, even when the clutch is depressed, because it transmits the braking torque on one side as drive torque to the other side.

The effect is based on a controlled redistribution of the drive torques and is also referred to as "Active Yaw Control (AYC)".

In known embodiments, a classic differential compensating transmission, for example a bevel-gear differential or planetary differential, is supplemented by two individual or combined superposition units.

SUMMARY OF THE INVENTION

An object of one aspect of the present invention is to provide an alternative transmission with a torque vectoring superposition unit.

The transmission comprises an input shaft, a first output shaft, a second output shaft, a first planetary gear set, and a second planetary gear set connected to the first planetary gear set. The planetary gear sets each comprise multiple elements. The input shaft, the two output shafts, the planetary gear sets and elements thereof are arranged and configured such that a torque introduced via the input shaft is converted and divided between the two output shafts in a defined ratio, and the generation of a sum torque is prevented. Here, at least one element of the first planetary gear set is connected rotationally conjointly to another element of the second planetary gear set, and a further element of the second planetary gear set is fixed to a non-rotatable structural element.

The elements of the planetary gear sets are in particular in the form of sun gear, planet carrier, and ring gear. If an element is fixed, it is prevented from rotating. The non-rotatable structural element of the transmission may preferably be a permanently static component, preferably a housing of the transmission, a part of such a housing or a structural element connected to said housing in a non-rotatable manner.

In the context of the invention, a "shaft" is to be understood to mean a rotatable structural part of the transmission, via which respectively associated components of the transmission are connected rotationally conjointly to one another or via which such a connection is established when a corresponding shift element is actuated. The respective shaft may in this case connect the components to one another axially or radially or both axially and radially. The respective shaft may thus also be present as an intermediate piece, via which a respective component is connected radially, for example. The term "shaft" does not preclude that the components to be connected may be formed in one piece.

In the context of the invention, "axial" means an orientation in the direction of a longitudinal central axis along which the planetary gear sets are arranged so as to lie coaxially with respect to one another. "Radial" is then to be understood to mean an orientation in the diameter direction of a shaft which lies on said longitudinal central axis.

A torque can be introduced into the transmission via the input shaft. The drive by which a torque can be introduced into the transmission may be realized by any drive source, for example by a drive machine in the form of an internal combustion engine or in the form of an electric machine.

The specification of the torque conversion is to be understood as follows:

The transmission has two output shafts, the torque sum of which, in relation to the input torque, describes the conversion of the transmission. The transmission has two output shafts, the respective speed ratio of which is initially not defined. It is the coupling of the two output shafts, for example via the wheels of the vehicle on a roadway, that first generates defined rotational speeds. If both output shafts rotate at the same rotational speed, for example during straight-ahead travel, then, as in the prior art, the speed ratio can be formed as a rotational speed ratio between the input rotational speed and one of the two identical output rotational speeds. In all other cases, it is not possible to use the common definition of torque conversion/speed ratio to specify a speed ratio of the transmission.

The two planetary gear sets of the transmission may be designed both as a minus or a plus planetary gear set. A combination of minus and plus planetary gear sets is also possible.

A minus planetary set is, in a manner known in principle to a person skilled in the art, made up of the elements sun gear, planet carrier, and ring gear, wherein the planet carrier guides at least one but preferably multiple planet gears in rotatably mounted fashion, which planet gears specifically mesh in each case with both the sun gear and the surrounding ring gear.

In the case of a plus planetary set, it is likewise the case that the elements sun gear, ring gear and planet carrier are present, wherein the latter guides at least one planet gear pair, in the case of which one planet gear is in tooth meshing engagement with the inner sun gear and the other planet gear is in tooth meshing engagement with the surrounding ring gear, and the planet gears mesh with one another.

Where a connection of the individual elements is possible, a minus planetary set can be converted into a plus planetary set, wherein, then, in relation to the embodiment of a minus planetary set, the ring gear and the planet carrier connections must be interchanged with one another and the magnitude of the static transmission ratio must be increased by one. Conversely, it would also be possible for a plus planetary set to be replaced by a minus planetary set, if the connection of the elements of the transmission allows this. In this case, in relation to the plus planetary set, the ring gear and the planet carrier connection would then likewise have to be interchanged with one another, and a static transmission ratio would have to be reduced by one, and the sign would have to be changed. In the context of the invention, the two planetary gear sets of the transmission are preferably each designed as a minus planetary gear set. These have good efficiency and can be arranged axially adjacent to one another and nested radially.

The first two planetary gear sets may be arranged axially adjacent to one another. The first planetary gear set may however also be arranged radially within the second planetary gear set. The latter embodiment is also referred to as a nested arrangement of the planetary gear sets.

The toothings of the two interconnected elements of the first and second planetary gear sets, that is to say of the third element of the first planetary gear set and of the first element of the second planetary gear set, may be formed on the same structural part. Furthermore, a pitch of the toothing on the third element of the first planetary gear set and on the first element of the second planetary gear set may be identical. The identical pitch allows the connecting structural part or the coupling shaft to be free from axial forces, such that an expensive axial bearing can be omitted.

The input shaft of the transmission may be connected to a drive machine, in particular an electric machine or an internal combustion engine, for the introduction of a torque into the transmission. According to an exemplary embodiment, the rotor of the electric machine is connected rotationally conjointly to the input shaft. As an alternative to this, in one possible embodiment of the transmission, the rotor is connected to the input shaft via at least one speed ratio stage. The electric machine may be arranged so as to lie either coaxially with respect to the planetary gear sets or axially parallel with respect thereto. In the first-mentioned case, the rotor of the electric machine may in this case either be directly connected rotationally conjointly to the input shaft or else coupled thereto via one or more interposed speed ratio stages, wherein the latter allows a more cost-effective design of the electric machine with higher rotational speed and lower torque. The at least one speed ratio stage may in this case be designed as a spur gear stage and/or as a planetary stage.

If, by contrast, the electric machine is provided so as to be axially offset with respect to the planetary gear sets, a coupling is thus realized via one or more interposed speed ratio stages and/or a traction mechanism drive. The one or more speed ratio stages may in this case also be implemented specifically either as a spur gear stage or as a planetary stage. A traction mechanism drive may be either a belt drive or a chain drive.

In the case of a coaxial arrangement of the electric machine, it is particularly preferred if the first output shaft is guided through the rotor of the electric machine. This makes the transmission with electric machine particularly compact.

The static transmission ratio of the second planetary gear set can be calculated at least approximately from the reciprocal of the static transmission ratio of the first planetary gear set minus 1.

Furthermore, a transmission is preferred in which the static transmission ratio of the second planetary set is calculated at least approximately from the reciprocal of the static transmission ratio of the first planetary set minus 1, that is to say: $i_{o2} = -1/i_{o1} - 1$.

In the event that the two planetary sets are designed as minus planetary sets (for example as per FIG. 2 or 3), this calculation rule has the effect that, if transmission losses are disregarded, the output torque is respectively divided equally between the two output shafts.

This is particularly advantageous if the invention is used for distributing the torque between two wheels on the same axle.

If a different torque distribution is desired or if the planetary gear sets are designed differently (for example FIGS. 4 to 9), a calculation rule can thus be defined analogously (FIG. 19). The wording "at least approximately" is used because, during operation under real conditions, the asymmetrical transmission losses in the direction of the two output shafts can have the effect that a slight deviation from the calculation rule is advantageous in order to obtain the same output torques at both shafts. Furthermore, this wording is used also because it is sometimes not possible to exactly adhere to the calculation rule while adhering to integer numbers of teeth and favorable combinations of numbers of teeth, for example with regard to acoustic requirements.

In FIG. 19, the calculation rules of the respective dependency of the static speed ratio of the second planetary gear set on the static speed ratio of the first planetary gear set are analogously specified for the gear set combinations with regard to FIGS. 4, 5, 6, 8, and 9. If transmission losses are disregarded, these each give rise to an output torque of equal magnitude and with the same sign at both output shafts.

The drive machine may be installed transversely with respect to a direction of travel. Furthermore, the two output shafts may be connected rotationally conjointly to the wheels of a vehicle.

It may furthermore be the case that the two output shafts distribute the introduced torque between different axles of a vehicle. An arrangement as a longitudinal transfer box (also called longitudinal transfer case) can thus be implemented, that is to say a transmission that distributes the introduced torque, for example, between multiple axles, in particular between a front axle and a rear axle of a vehicle.

The torque distribution of the transmission does not need to be uniform between the output shafts. In particular in the case of the embodiment as a longitudinal transfer box, a non-uniform distribution between one and the other axle may be realized. For example, the torque provided by the input shaft may be distributed such that 60% is directed to the rear axle and 40% to the front axle.

It has been found to be particularly advantageous if the first and second planetary gear sets are designed as minus planetary gear sets. These have good efficiency and can be arranged axially adjacent to one another and nested radially.

In the case of a combination of minus and plus planetary gear sets in a nested arrangement, the radially inner planetary gear set may be a minus planetary gear set and the radially outer planetary gear set may be a plus planetary gear set. Here, on the one hand, an easily implemented nesting capability is maintained. In addition, in this context, the fixed ring gear also offers the advantage that the (normally) relatively poor efficiency caused by the plus planetary gear set only affects one output shaft.

It is additionally possible for a transmission gearing or a multi-ratio transmission, preferably a 2-ratio transmission, to be connected upstream of the transmission. This transmission gearing or multi-ratio transmission may then also be a constituent part of the transmission and serves to configure an additional speed ratio by, for example, converting the rotational speed of the drive machine and driving the input shaft with this converted rotational speed. The multi-ratio transmission or transmission gearing may in particular be in the form of a planetary transmission.

The elements of the transmission may be designed as follows:

a) Transmission with two minus planetary gear sets, wherein
the first element of the first planetary gear set is a sun gear,
the second element of the first planetary gear set is a planet carrier and
the third element of the first planetary gear set is a ring gear, and wherein
the first element of the second planetary gear set is a sun gear,
the second element of the second planetary gear set is a planet carrier, and
the third element of the second planetary gear set is a ring gear.

This transmission could be referred to as a first concept with two minus planetary gear sets.

b) Transmission with two minus planetary gear sets, wherein
the first element of the first planetary gear set is a sun gear,
the second element of the first planetary gear set is a ring gear, and
the third element of the first planetary gear set is a planet carrier, and wherein
the first element of the second planetary gear set is a ring gear,
the second element of the second planetary gear set is a planet carrier, and
the third element of the second planetary gear set is a sun gear.

This transmission could be referred to as a second concept with two minus planetary gear sets.

c) Transmission with two minus planetary gear sets, wherein
the first element of the first planetary gear set is a ring gear,
the second element of the first planetary gear set is a planet carrier, and
the third element of the first planetary gear set is a sun gear, and wherein
the first element of the second planetary gear set is a sun gear,
the second element of the second planetary gear set is a planet carrier, and
the third element of the second planetary gear set is a ring gear.

This transmission could be referred to as a fifth concept with two minus planetary gear sets.

d) Transmission with one plus and one minus planetary gear set, wherein the second planetary gear set is the minus planetary gear set, wherein
the first element of the first planetary gear set is a sun gear,
the second element of the first planetary gear set is a ring gear, and
the third element of the first planetary gear set is a planet carrier, and wherein
the first element of the second planetary gear set is a sun gear,
the second element of the second planetary gear set is a planet carrier, and
the third element of the second planetary gear set is a ring gear.

This transmission is, as it were, the first concept with one plus planetary gear set.

e) Transmission with one plus and one minus planetary gear set, wherein the first planetary gear set is the minus planetary gear set, wherein
the first element of the first planetary gear set is a sun gear,
the second element of the first planetary gear set is a planet carrier, and
the third element of the first planetary gear set is a ring gear, and wherein
the first element of the second planetary gear set is a sun gear,
the second element of the second planetary gear set (P2) is a ring gear, and
the third element of the second planetary gear set is a planet carrier.

f) Transmission with two plus planetary gear sets, wherein
the first element of the first planetary gear set is a sun gear,
the second element of the first planetary gear set is a ring gear, and
the third element of the first planetary gear set is a planet carrier, and wherein
the first element of the second planetary gear set is a sun gear,
the second element of the second planetary gear set is a ring gear, and
the third element of the second planetary gear set is a planet carrier.

This transmission is, as it were, the first concept with two plus planetary gear sets.

The torque vectoring superposition unit comprises a third planetary gear set and an actuator. Here, a first element of the third planetary gear set is connected rotationally conjointly to the connecting shaft. A second element of the third planetary gear set is connected to an output element of the actuator. A third element of the third planetary gear set is connected rotationally conjointly to a second element of the first planetary gear set, which in turn is connected rotationally conjointly to the first output shaft.

Such a transmission combines the two functions of torque conversion and torque distribution in a single assembly. The transmission constitutes, so to speak, a combined transmission gearing and differential transmission, which on the one hand can implement a torque conversion with the aid of a housing support and on the other hand can implement the torque distribution to the output shafts. A torque vectoring superposition unit is additionally provided.

In the context of one aspect of the invention, the fact that two structural elements of the transmission or of the torque vectoring superposition unit are rotationally conjointly "connected" or "coupled" or "are connected to one another" refers to a permanent coupling of these components such that they cannot rotate independently of one another. In particular, no shift element is provided between these structural elements, which may be elements of the planetary gear sets and/or also shafts and/or a non-rotatable structural element of the transmission, but the corresponding structural elements are fixedly coupled to one another. A rotationally elastic connection between two structural parts is also understood to be conjoint or rotationally conjoint. In particular, a rotationally conjoint connection may also include joints, for example in order to allow a steering movement or a spring compression movement of a wheel.

The actuator of the torque vectoring superposition unit has a rotatable output element which, in its further course, is connected rotationally conjointly to an element of the third planetary gear set. The "connection" of the output element of the actuator to the second element of the transmission gearing of the torque vectoring superposition unit is to be understood in the context of the invention to mean a connection which is such that a constant rotational speed dependency prevails. The actuator may for example be in the form of an electric machine or a hydraulic motor. Compared to hydraulic motors, electric motors have the advantage that they do not have a concurrently operating hydraulic pump and therefore have lower standstill losses. In addition, electric motors are easier to control than hydraulic motors.

Depending on the torque direction, the actuator of the torque vectoring superposition unit can selectively distribute the torque to the first or the second output shaft of the transmission. It is pointed out at this juncture that the rotational speed of the actuator is decisive in determining which output shaft rotates faster. The actuator rotational speed in the case of which both output shafts rotate at the same rotational speed can be influenced, and for example set to zero, through selection of the static transmission ratio of the third planetary gear set P3. The sign of the torque is decisive in determining which output shaft has more torque (four-quadrant operation).

The static transmission ratio of the third planetary gear set can be selected in accordance with the demand on the torque vectoring superposition unit. If said static transmission ratio is selected in such a way that the output element of the actuator comes to a standstill during straight-ahead travel, the actuator, in particular electric machine or hydraulic motor, can be designed with a particularly low power requirement or low consumption.

The third planetary gear set of the torque vectoring superposition unit may be arranged axially adjacent to the first planetary gear set or else radially outside the first planetary gear set of the transmission. The third planetary gear set may likewise be configured as a minus planetary gear set. In another embodiment, it may be configured as a plus planetary gear set. Furthermore, the third planetary gear set may be of stepped-planet design, in particular configured as a plus planetary gear set of stepped-planet design.

To increase the speed ratio of the rotational speed of the output of the actuator (actuator rotational speed), for example the rotor rotational speed of the rotor of the electric machine, it is preferred to arrange at least one transmission gearing between the second element of the third planetary gear set and the rotor. In particular, one or more planetary gear sets and/or one or more spur-gear stages may be considered as a transmission gearing.

A particularly preferred aspect of the invention is one in which two transmission gearings, in particular in the form of two planetary gear sets, are arranged between the second element of the third planetary gear set and the actuator, in particular two planetary gear sets.

The transmission with the torque vectoring superposition unit is in particular part of a motor vehicle drivetrain for a hybrid or electric vehicle and is then arranged between a drive machine, configured as an internal combustion engine or electric machine, of the motor vehicle and further components of the drivetrain that follow in the direction of power flow to drive wheels of the motor vehicle. The transmission may also be part of a drivetrain for a conventional motor vehicle, that is to say a vehicle that is driven only by an internal combustion engine.

According to a further aspect, a drivetrain having an above-described transmission with a torque vectoring superposition unit, and a vehicle having a transmission of said type or having a drivetrain of said type, are provided. The advantages of the transmission with torque vectoring superposition unit likewise apply to the drivetrain and to the vehicle having such a transmission with a torque vectoring superposition unit.

The invention is not restricted to the stated combination of the features of the main claim or of the claims dependent thereon. Possibilities additionally arise for combining individual features with one another, also insofar as they emerge from the claims, from the following description of preferred embodiments of the invention or directly from the drawings. The reference by the claims to the drawings through the use of reference designations is not intended to limit the scope of protection of the claims.

BRIEF DESCRIPTION OF THE DRAWINGS

Advantageous embodiments of the invention, which will be discussed below, are illustrated in the drawings. In the drawings:

FIGS. 1A-1E are schematic views of a vehicle;

FIGS. 15-18 are a schematic illustrations of the functional principle of the invention;

FIG. 19 is an overview of the static transmission ratios of the individual embodiments; and FIGS. 20-29 are schematic views of a respective drivetrain having a transmission with a torque vectoring superposition unit.

DETAILED DESCRIPTION OF THE PRESENTLY PREFERRED EMBODIMENTS

FIGS. 1A to 1E each show a schematic view of a transmission G, having a torque vectoring superposition unit which is not illustrated in any more detail, of a motor vehicle drivetrain 100 of a vehicle 1000 in the form of a passenger motor vehicle.

Figure 1A:
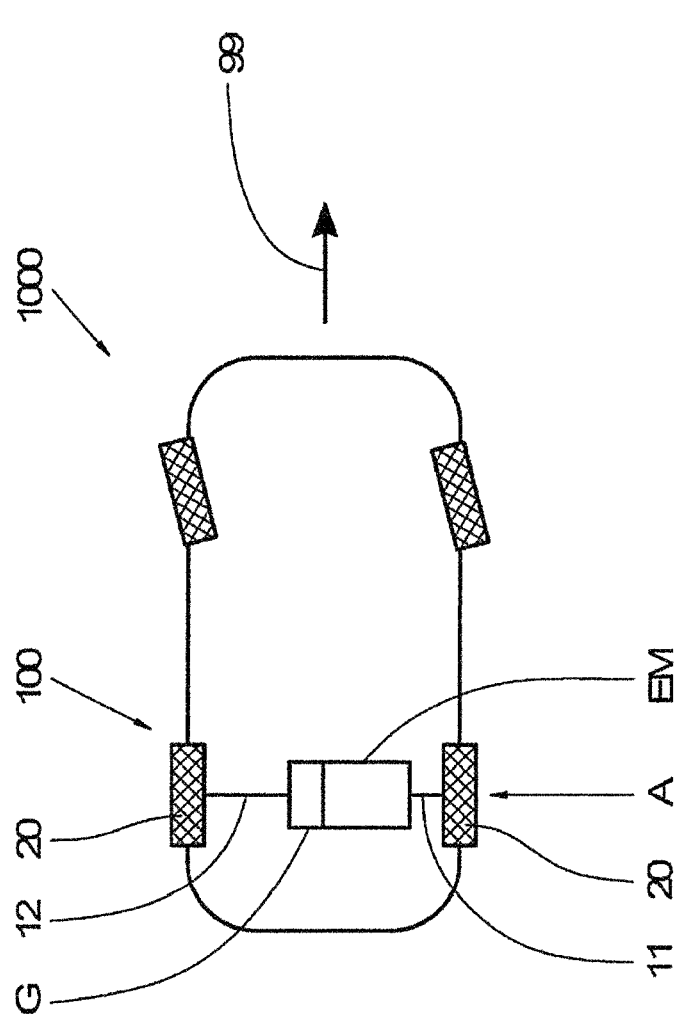

The drivetrain 100 as per FIG. 1A shows an electric drive which drives the rear axle A of the vehicle 1000. The drivetrain comprises a transmission G, which divides the drive torque of the electric machine EM between two output shafts 11 and 12. The transmission G and the electric machine are arranged in a common housing. The forward direction of travel is illustrated by arrow 99. As can also be seen in FIG. 1A, the transmission G and the electric machine EM are oriented transversely with respect to the direction of travel of the vehicle.

Figure 1B:
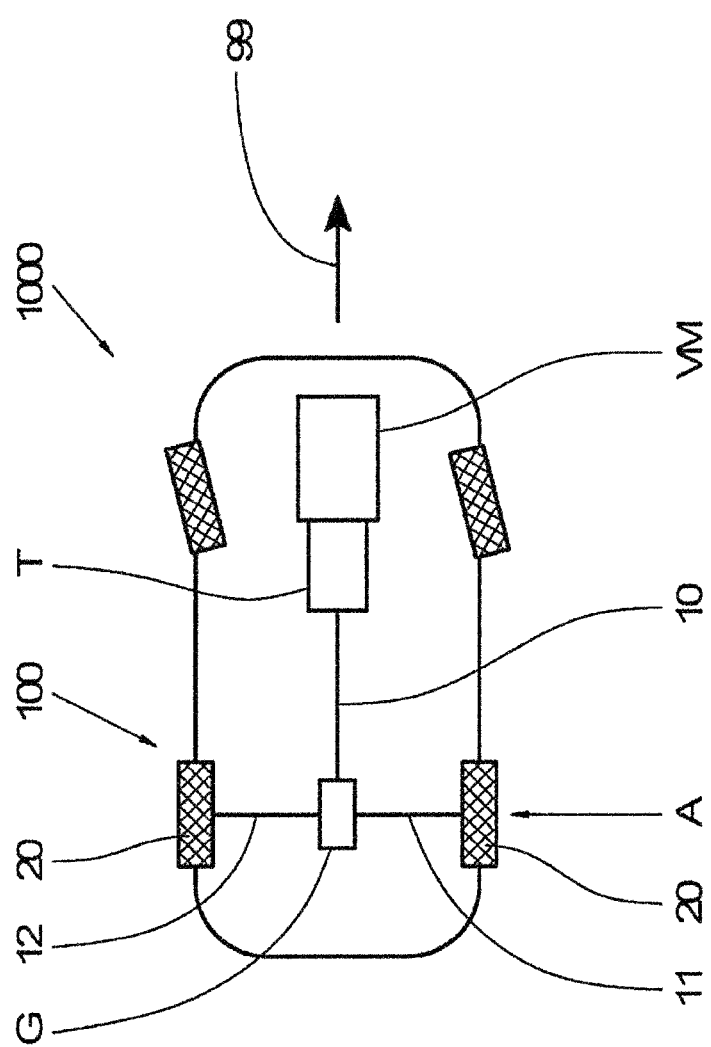

The drivetrain 100 as per FIG. 1B shows an internal combustion engine drive which drives the rear axle A of the vehicle 1000. The drivetrain comprises a transmission G, which divides the drive torque of the internal combustion engine VM between two output shafts 11 and 12, wherein a further transmission, for example an automatic transmission of the vehicle, is arranged between the transmission G and the internal combustion engine VM. The forward direction of travel is illustrated by arrow 99. As can also be seen in FIG. 1A, the transmission G and the internal combustion engine VM are oriented longitudinally with respect to the direction of travel of the vehicle.

Figure 1C:
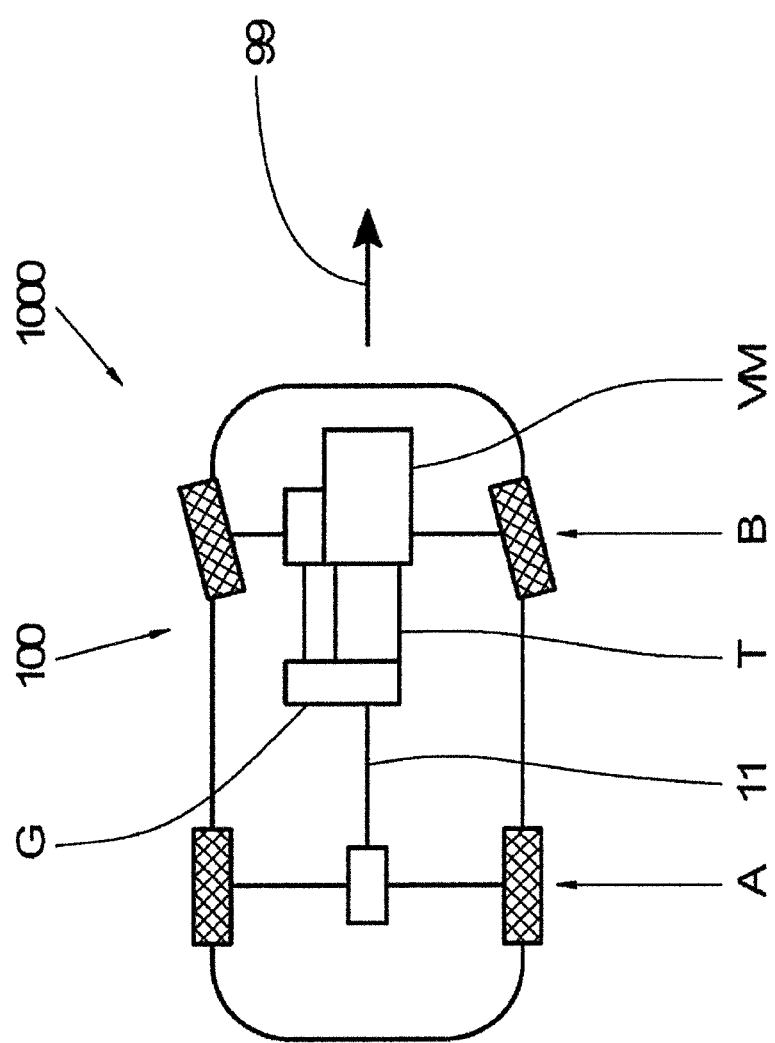

The drivetrain 100 as per FIG. 1C shows an internal combustion engine drive which drives the rear axle A and the front axle B of the vehicle 1000. The drivetrain comprises a transmission G, which divides the drive torque of the internal combustion engine VM between the axles A and B, wherein a further transmission, for example an automatic transmission of the vehicle, is arranged between the transmission G and the internal combustion engine VM. The transmission G may then be connected via an output shaft 11 to an axle differential of the rear wheel axle A and via an output shaft 12 to an axle differential of the front axle B. The forward direction of travel is illustrated by arrow 99. As can also be seen in FIG. 1C, the transmission G and the internal combustion engine VM are oriented longitudinally with respect to the direction of travel of the vehicle.

Figure 1D:
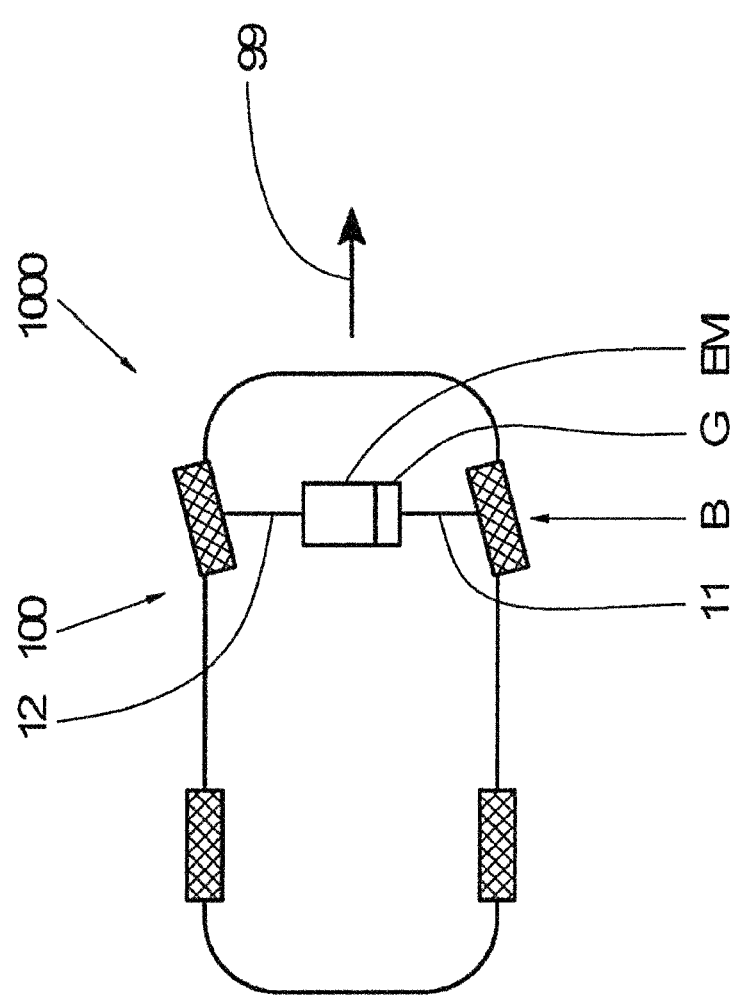

The drivetrain 100 as per FIG. 1D shows an electric drive which drives the front axle B of the vehicle 1000, that is to say an electric front transverse drive. The drivetrain comprises a transmission G, which divides the drive torque of the electric machine EM between two output shafts 11 and 12. The transmission G and the electric machine are arranged in a common housing. The forward direction of travel is illustrated by arrow 99. As can also be seen in FIG. 1D, the transmission G and the electric machine EM are oriented transversely with respect to the direction of travel of the vehicle.

The drivetrain 100 as per FIG. 1E shows an electric all-wheel drive which drives the rear axle A and the front axle B of the vehicle 1000. This involves a transmission designed as a longitudinal transfer case. The drivetrain comprises a transmission G, which divides the drive torque of the electric machine EM between two output shafts 11 and 12. The output shaft 11 transmits the torque to the front axle B, whereas the output shaft 12 transmits the torque to the rear axle A. The respective torques are then in turn introduced into respective axle differentials. The transmission G and the electric machine are arranged in a common housing. The forward direction of travel is illustrated by arrow 99. As can also be seen in FIG. 1E, the transmission G and the electric machine EM are oriented transversely with respect to the direction of travel of the vehicle.

Figure 2:
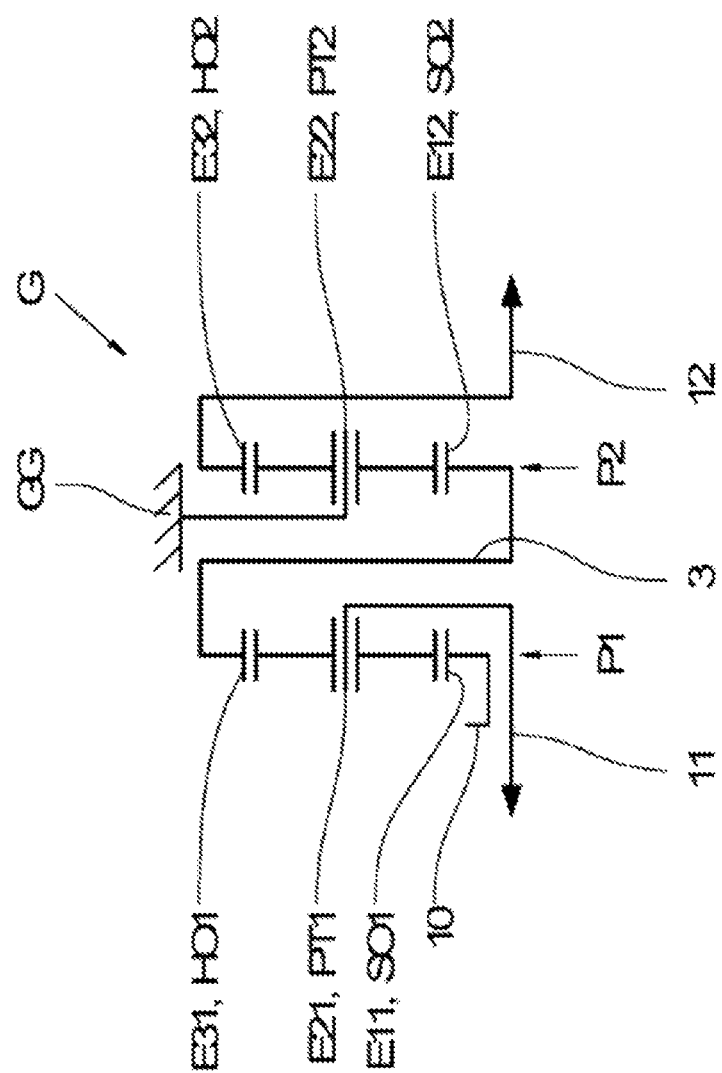
FIGS. 2-7 each show a schematic view of an exemplary transmission that can be used with a torque vectoring superposition unit according to the invention in the vehicle from FIGS. 1Aa-1E.

FIG. 2 shows a transmission G in a first exemplary embodiment. The transmission G comprises an input shaft 10, a first output shaft 11, a second output shaft 12, a first planetary gear set P1 and a second planetary gear set P2 connected to the first planetary gear set P1. In the present case, the planetary gear sets P1 and P2 are each designed as a minus planetary gear set. The planetary gear sets P1, P2 each comprise multiple elements E11, E21, E31, E12, E22, E32, wherein the first element E11 is a sun gear SO1, the second element E21 is a planet carrier PT1 and the third element E31 of the first planetary gear set P1 is a ring gear HO1. In the case of the second planetary gear set P2, the first element E12 is a sun gear SO2, the second element E22 is a planet gear carrier PT2 and the third element E32 is a ring gear HO2. The planet gear carriers PT1, PT2 each support multiple planet gears, which are illustrated but not designated. The planet gears mesh both with the respective radially inner sun gear and with the respective surrounding ring gear. The input shaft 10, the first output shaft 11 and the second output shaft 12 are arranged coaxially with respect to one another. The two planetary gear sets P1, P2 are likewise arranged coaxially with respect to one another.

In the present case, the input shaft 10 is connected rotationally conjointly to the first element E11. The first output shaft 11 is connected rotationally conjointly to the second element E21 of the first planetary gear set. The second output shaft 12 is connected rotationally conjointly to the third element E32 of the second planetary gear set. The third element E31 of the first planetary gear set P1 is connected rotationally conjointly to the first element E12 of the second planetary gear set P2, whereas the second element E22 of the second planetary gear set P2 is fixed to a non-rotatable structural element GG. The non-rotatable structural element GG is a transmission housing of the transmission G.

The third element E31, that is to say the ring gear HO1 of the first planetary gear set P1, and the first element E12, that is to say the sun gear SO2 of the second planetary gear set, form a common structural part, which in the present case is in the form of a connecting shaft or shaft 3.

As can be seen in FIG. 2, the input shaft 10, the first output shaft 11 and the second output shaft 12 are arranged coaxially with respect to one another. The two planetary gear sets P1, P2 are likewise arranged coaxially with respect to one another. According to this embodiment, the two planetary gear sets P1, P2 are arranged so as to be axially spaced apart from one another.

The input shaft 10 may be connected to a drive machine and thus introduce an input torque into the transmission G. That is to say, the input shaft 10 and output shafts 11, 12 rotate in the same direction. Through the connection of the two planetary gear sets P1, P2 to one another and the support of the second element E22 on the housing GG, the introduced input torque can be distributed between the two output shafts 11, 12. In this case, the transmission performs not only the function of a transmission gearing but additionally that of a differential gear. That is to say, the introduced torque is not only subjected to a speed ratio but is also distributed between various output shafts. In this embodiment, no reversal of the direction of rotation occurs.

Figure 3:
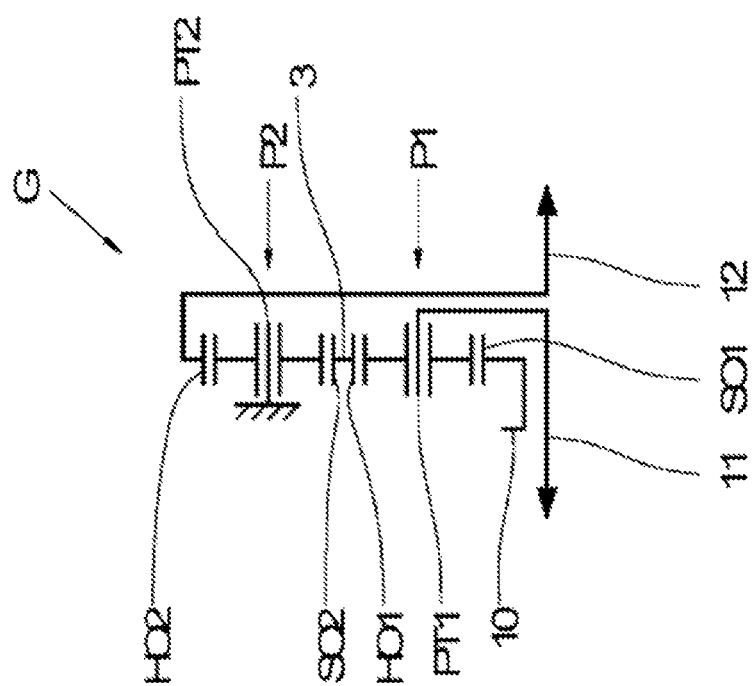

FIG. 3 shows a further exemplary embodiment of the transmission G. By contrast to the embodiment as per FIG. 2, the embodiment as per FIG. 3 shows a radially nested arrangement of the two planetary gear sets P1, P2. Whereas the embodiment as per FIG. 2 proposes an extremely radially compact solution, the embodiment as per FIG. 3 makes possible an extremely axially compact transmission G. The first planetary gear set P1 in this case forms the radially inner planetary gear set. The second planetary gear set P2 forms the radially outer planetary gear set. The first planetary gear set P1 is accordingly situated radially within the second planetary gear set P2. In this embodiment, too, the connection of the first ring gear HO1 of the first planetary gear set P1 to the sun gear SO2 of the second planetary gear set is configured as a single structural part, which in the present case is likewise in the form of a shaft 3. It is likewise the case in this embodiment that no reversal of the direction of rotation occurs.

Figure 4:
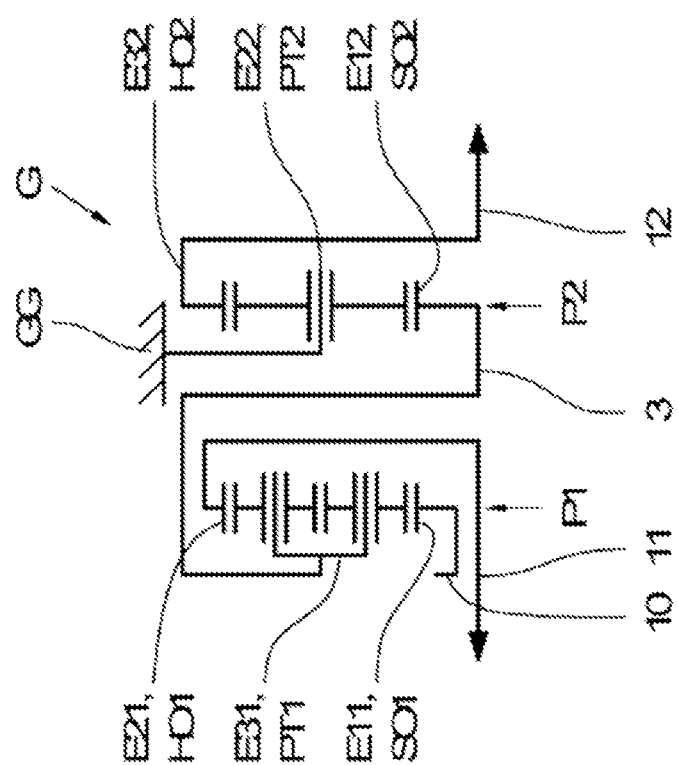

FIG. 4 shows a transmission G in a further exemplary embodiment. By contrast to FIG. 2, the first planetary gear set P1 is now configured as a plus planetary gear set. That is to say, the third element E31 of the first planetary gear set is configured as a planet gear carrier, which is connected rotationally conjointly to the first element E12 of the second planetary gear set, that is to say the sun gear SO2. The second element E21 is now configured as a ring gear HO1 and is connected rotationally conjointly to the first output shaft 11. The third element E31 of the first planetary gear set and the first element E12 of the second planetary gear set are in turn formed on the same structural part, which in the present case is in the form of a shaft 3. Reference is otherwise made to the statements relating to FIG. 2.

Figure 5:
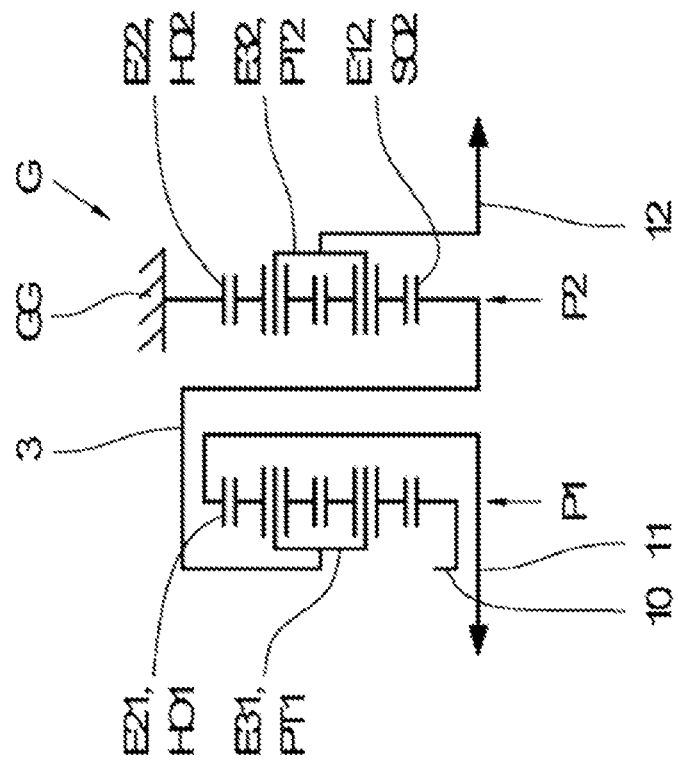

FIG. 5 shows a further exemplary embodiment of the transmission G. By contrast to the embodiment as per FIG. 2, it is now the case that both planetary gear sets P1, P2 are configured as plus planetary gear sets. Thus, the second element E21 is configured as a ring gear HO1 and is connected rotationally conjointly to the first output shaft 11. The third element E31 is now configured as a planet carrier PT1 and is connected rotationally conjointly to the first element E12, that is to say the sun gear SO2 of the second planetary gear set P2. The second element E22 of the second planetary gear set P2 is now configured as the ring gear HO2 and is fixed to the non-rotatable structural element GG. By contrast, the third element E32 of the second planetary gear set P2 is configured as a planet carrier PT2 and is connected rotationally conjointly to the second output shaft 12.

Thus, in the case of the two planetary gear sets P1, P2, the planet carrier and ring gear connections have been interchanged. Reference is otherwise made to the statements relating to FIG. 2.

Figure 6:
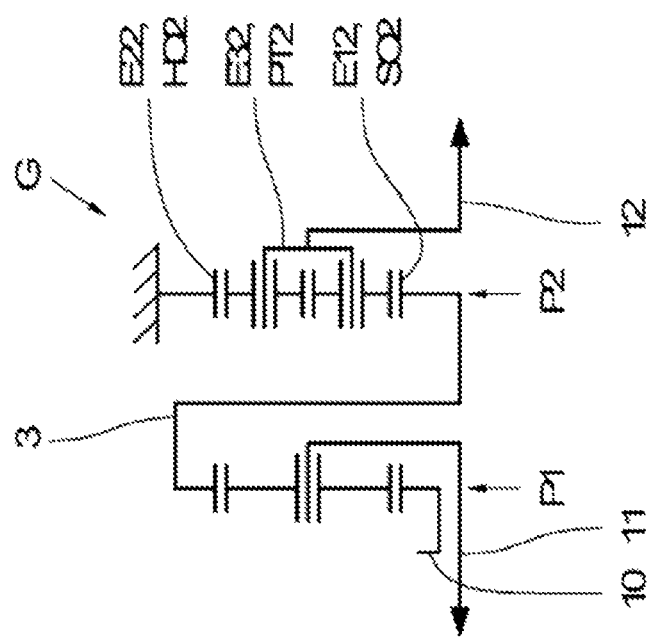

FIG. 6 shows a transmission in a further exemplary embodiment. By contrast to the embodiment as per FIG. 2, the second planetary gear set P2 is configured as a plus planetary gear set, whereas the first planetary gear set P1 remains unchanged. Thus, the ring gear HO2 of the second planetary gear set P2 is fixed to the housing GG. In addition, the planet carrier PT2 is connected rotationally conjointly to the second output shaft 12. The planet carrier and ring gear connections of the second planetary gear set have thus been interchanged. Reference is otherwise made to the statements relating to FIG. 2.

Figure 7:
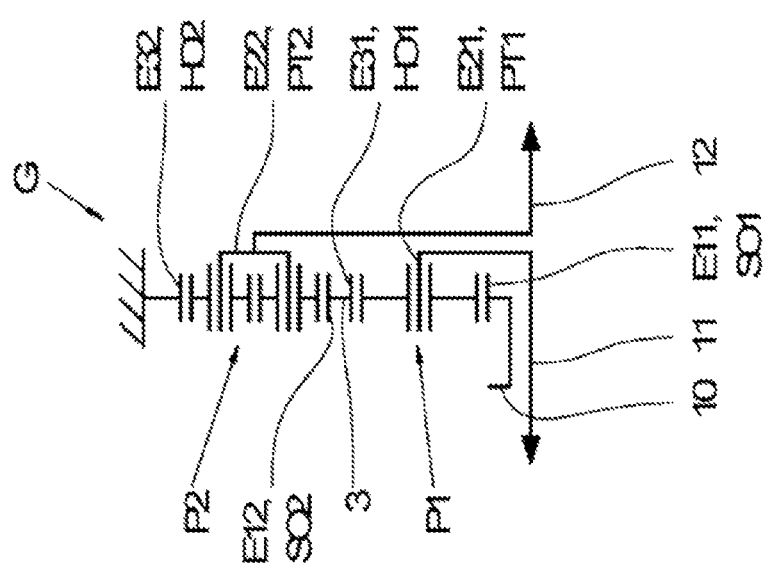

FIG. 7 shows a further exemplary embodiment of the transmission G. By contrast to the embodiment as per FIG. 6, the embodiment as per FIG. 7 provides radially nested planetary gear sets P1, P2. The planetary gear set situated radially at the inside is the first planetary gear set P1. The planetary gear set situated radially at the outside is the second planetary gear set P2. Reference is otherwise made to the statements relating to FIGS. 6 and 2.

Figure 8:
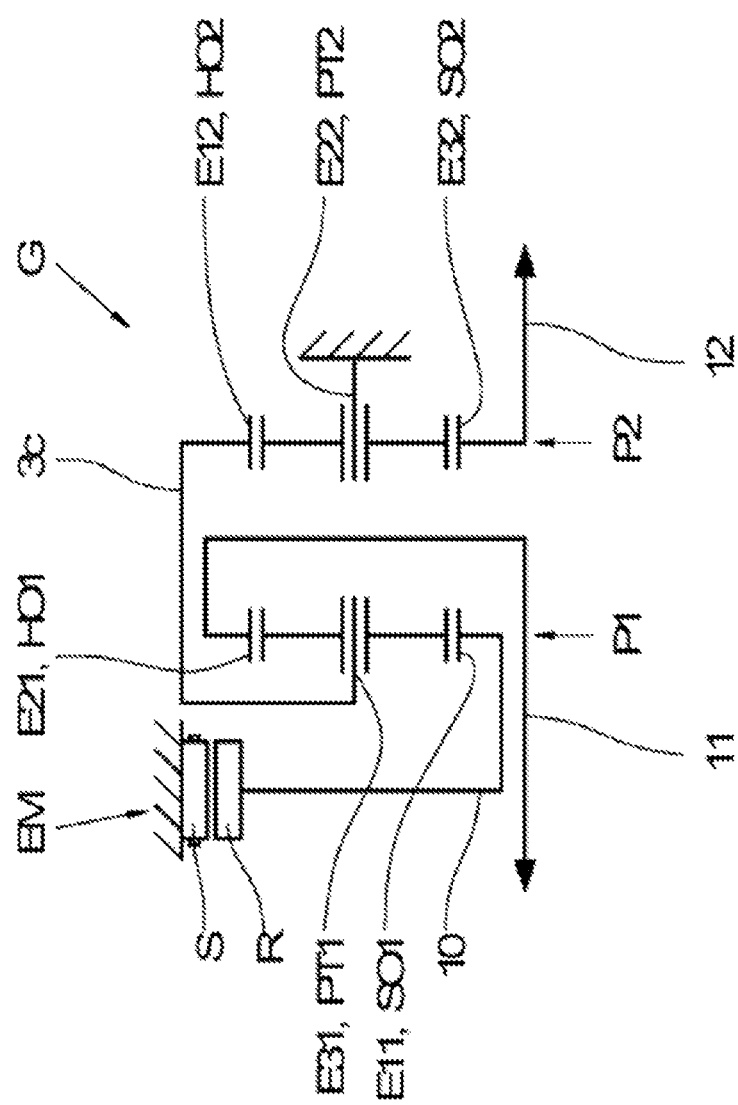
FIGS. 8-13 each show a schematic view of an exemplary drivetrain having a transmission with a torque vectoring superposition unit, as can be used in the vehicle from FIGS. 1A to 1E.

FIG. 8 shows the transmission G in a further exemplary embodiment. This embodiment has the following differences in relation to the embodiment as per FIG. 2. Firstly, a drive machine in the form of an electric machine EM is provided. The electric machine EM comprises a stator S, which is fixed to the housing, and a rotor R. The rotor R of the electric machine EM is connected rotationally conjointly to the first element E11, that is to say the sun gear SO1 of the first planetary gear set. A further difference is that the second element E21 of the first planetary gear set is configured as a ring gear HO1 and is connected rotationally conjointly to the first output shaft 11. Furthermore, the third element E31 of the first planetary gear set P1 is configured as a planet carrier PT1 and is connected rotationally conjointly to the first element E12 of the second planetary gear set P2, which in the present case is configured as a ring gear HO2. The second element E22 of the second planetary gear set is furthermore configured as a planet carrier PT2 and is fixed to the housing GG. Accordingly, the third element E32 is configured as a sun gear SO2 and is connected rotationally conjointly to the second output shaft 12. In this exemplary embodiment, a reversal of the direction of rotation of the input rotational speed occurs. Nesting of the planetary gear sets P1, P2 is not possible in this embodiment.

In other words, the torque continues to be introduced via the sun gear SO1 of the first planetary gear set P1, whereas the output is ensured via the ring gear HO1. By contrast to the situation in FIG. 2, the planet carrier of the first planetary gear set P1 is now connected rotationally conjointly to the ring gear HO2 of the second planetary gear set. By contrast to the embodiment as per FIG. 2, the output of the second planetary gear set accordingly takes place via the sun gear SO2.

Figure 9:
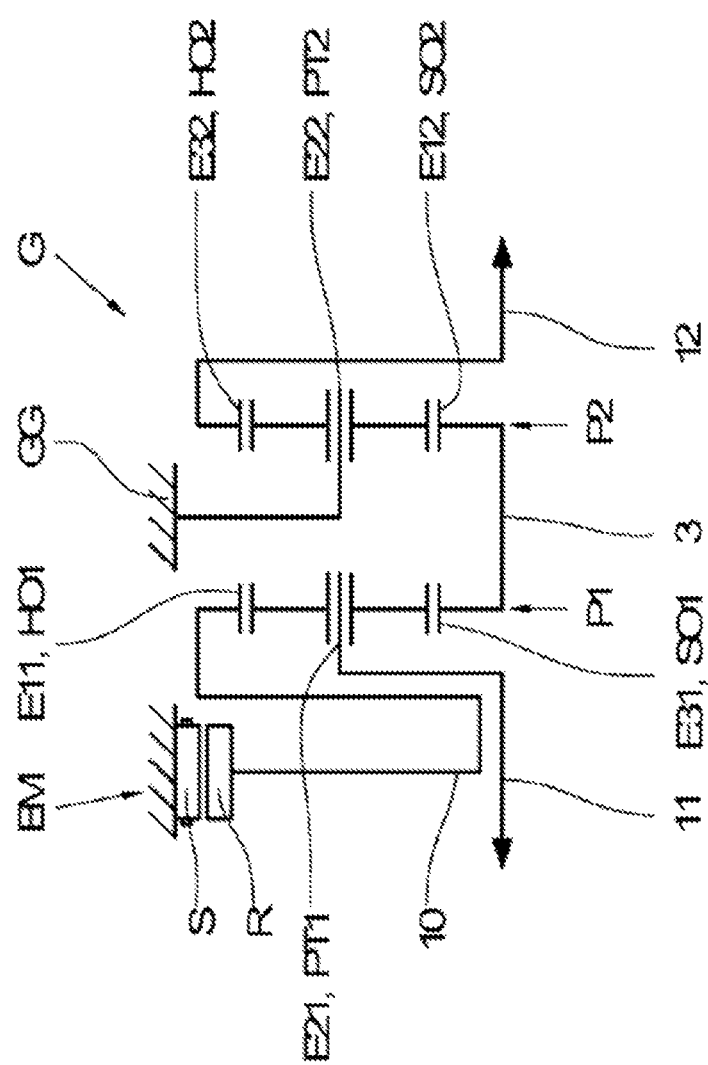

FIG. 9 shows a further exemplary embodiment of the transmission G. The embodiment has the following differences in relation to the embodiment as per FIG. 2. Firstly, a drive machine in the form of an electric machine EM is provided, which has a stator S, which is fixed to the housing, and a rotor R. The rotor R is connected rotationally conjointly to the input shaft 10, which in turn is connected to the first element E11, which in the present case is configured as a ring gear HO1, of the first planetary gear set P1. The first output shaft 11 is in the present case connected to the second element E21, which in the present case is in the form of a planet carrier PT2, of the first planetary gear set P1. The third element E31 of the first planetary gear set P1, which in the present case is configured as a sun gear SO1, is connected rotationally conjointly to the first element E12, that is to say the sun gear SO2 of the second planetary gear set P2. The other elements of the second planetary gear set remain unchanged.

By contrast to the embodiment as per FIG. 2, it is the case in the embodiment as per FIG. 9 that the introduction of the torque takes place via the ring gear HO1 of the first planetary gear set P1, whereas the output of the first planetary gear set P1 continues to be realized via the planet carrier PT1. By contrast to FIG. 2, the two planetary gear sets P1, P2 are connected via a common sun gear, which in the present case is in the form of a shaft 3.

FIG. 9A shows a specific embodiment of the transmission G for the drivetrain from FIG. 1c. Output 12 transmits the torque to the rear axle A. Output 11 transmits the torque to the front axle B. As can be clearly seen, the output shafts 11, 12 are arranged axially parallel with respect to one another—and not coaxially with respect to one another. The second output shaft 12 of the second planetary gear set P2 meshes with an intermediate toothed gear ZZ, which in turn is connected to a shaft which in turn introduces the torque into a rear-axle differential (not illustrated).

Figure 10:
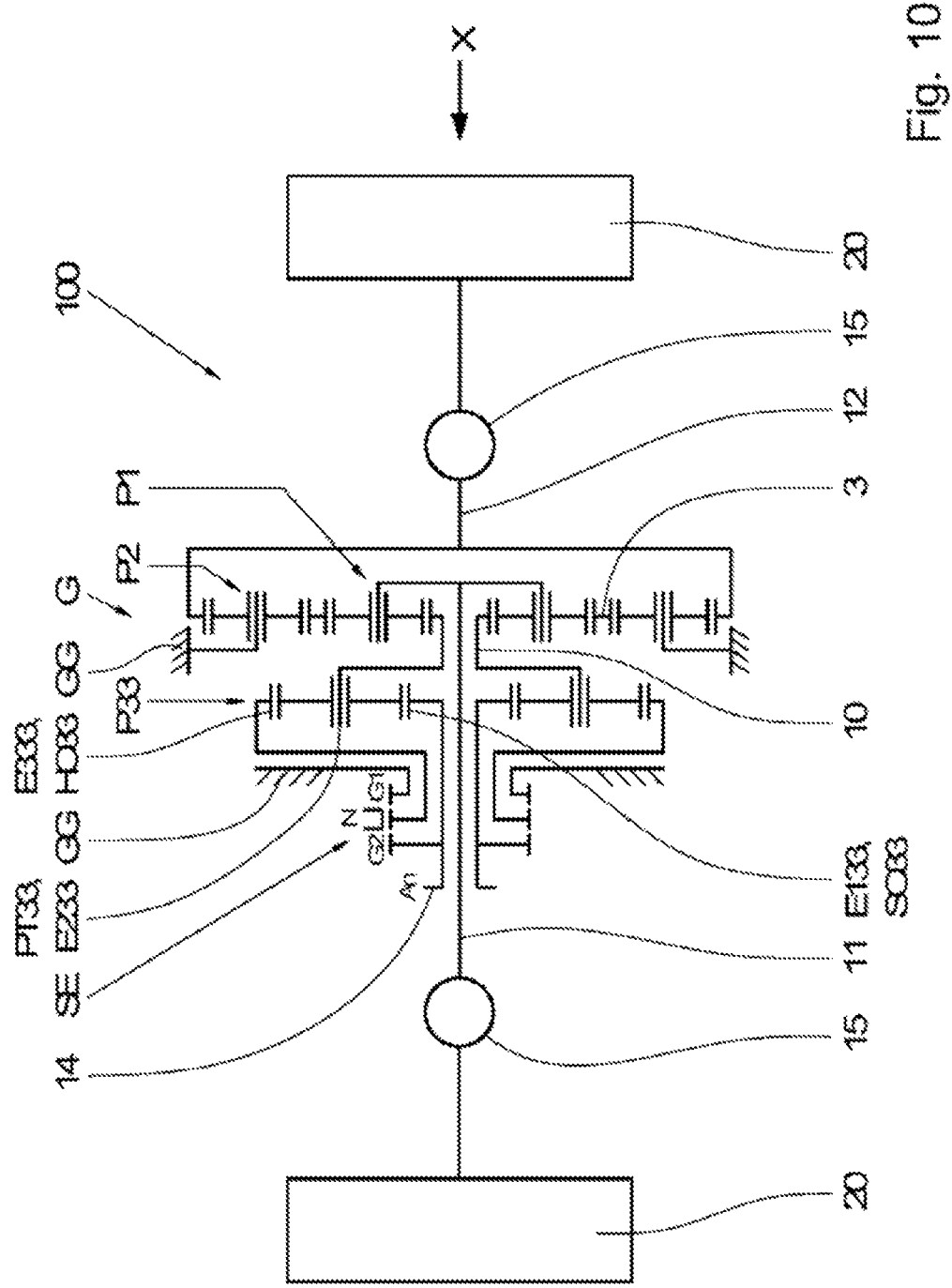

FIG. 10 shows a drivetrain 100 of a vehicle with a transmission in an exemplary embodiment, wherein a transmission gearing in the form of a planetary gear P33 is additionally connected upstream of the transmission G.

The transmission G is the embodiment as per FIG. 3, to which reference is hereby made. The planetary gear set P33 is configured as a minus planetary gear set and has a first element E133, which is configured as a sun gear, a second element E233, which is configured as a planet carrier, and a third element E333, which in the present case is configured as a ring gear HO33. The second element E233 of the additional planetary gear set P33 is connected rotationally conjointly to the input shaft 10 of the transmission G.

Furthermore, a shift element SE is assigned to the planetary transmission P33. The shift element SE is configured to fix the third element E333 to the non-rotatable structural element GG. Furthermore, the shift element SE is configured to, in a second shift position, connect the third element E333 to the first element E133 of the planetary gear set P33, that is to say to place these in a block state. If a planetary gear set is in a block state, the speed ratio is always 1, regardless of the number of teeth. In other words, the planetary gear set revolves as a block. In a third shift position, the third element E333 is not fixed to the housing, nor is the planetary gear set P33 in a block state. The shift element SE is in this case present in a neutral shift position. The first shift position of the shift element SE is denoted by the reference designation G1, which at the same time represents a first gear ratio stage. The second shift position is denoted by the reference designation G2, which at the same time represents a second gear ratio stage. The first element E13 of the planetary gear set P3 is connected via an input shaft 14 to a drive machine (not illustrated). If the shift element SE is in its neutral position, the drive torque introduced into the transmission gearing P33 is not transmitted to the input shaft 10 of the transmission G.

As can also be clearly seen from FIG. 10, the transmission gearing P33 is arranged coaxially with respect to the input shaft 10 and with respect to the output shafts 11, 12. In addition, it can be clearly seen how the first output shaft 11 is guided through the input shaft 10 designed as a hollow shaft and, over the further course, through the further shaft 14 designed as a hollow shaft. The two output shafts 11, 12 are each connected to a drive wheel 20. Vibration dampers 15 are provided in order to absorb the vibrations of the vehicle.

Figure 11:
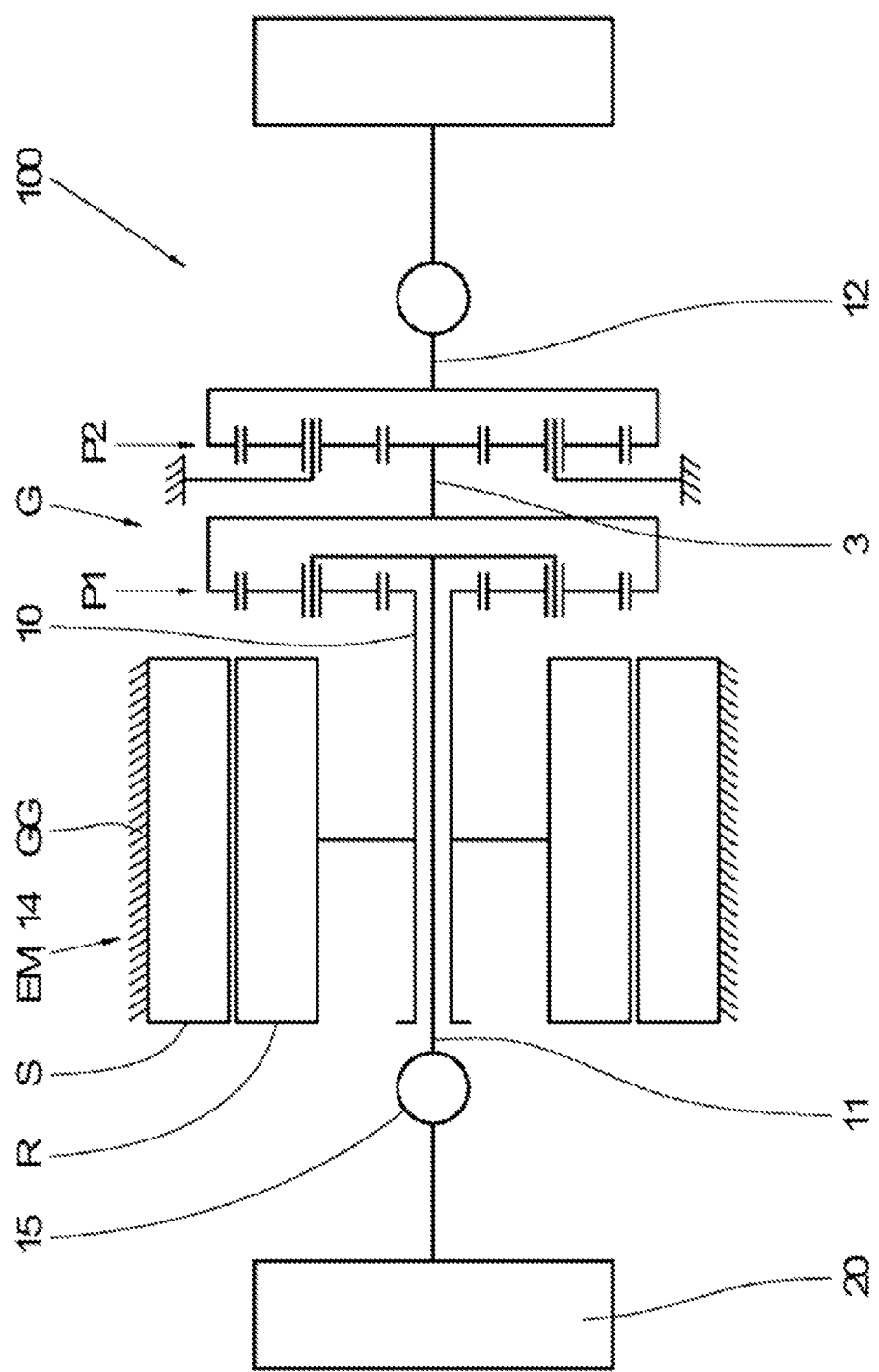

FIG. 11 shows a drivetrain of a vehicle having a transmission in a further exemplary embodiment. The transmission G is the preferred embodiment as per FIG. 2, to which reference is made. By contrast to FIG. 10, no transmission gearing is connected upstream in the embodiment as per FIG. 11. The drive machine is configured as an electric machine EM. The electric machine EM has a stator S, which is fixed to the housing, and a rotor R. The rotor R is connected rotationally conjointly to the input shaft 10. As can be clearly seen, the electric machine EM is arranged coaxially with respect to the input shaft 10 and with respect to the output shafts 11, 12. In addition, said electric machine is thus arranged coaxially with respect to the planetary gear sets P1, P2. The input shaft 10 is configured as a hollow shaft through which the first output shaft 11 is guided. Reference is otherwise made to the statements relating to FIG. 10.

Figure 12:
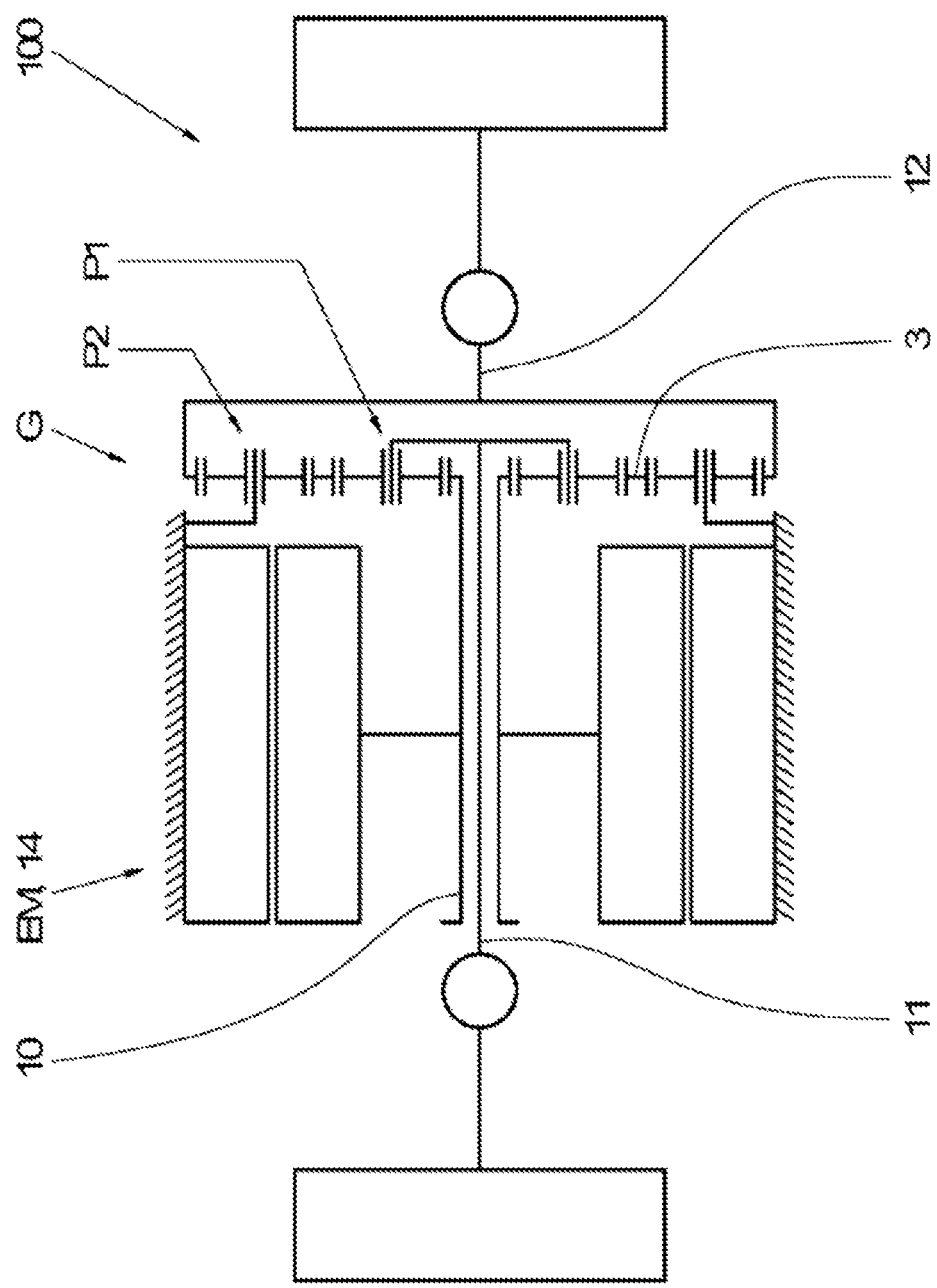

FIG. 12 shows a further drivetrain 100 with a transmission G in an exemplary embodiment. By contrast to the embodiment as per FIG. 11, the planetary gear sets P1, P2 are arranged not axially adjacent to one another but radially one above the other, that is to say in nested fashion. The transmission G is thus the preferred embodiment from FIG. 3. Reference is otherwise made to the statements relating to FIG. 11 and FIG. 3.

Figure 13:
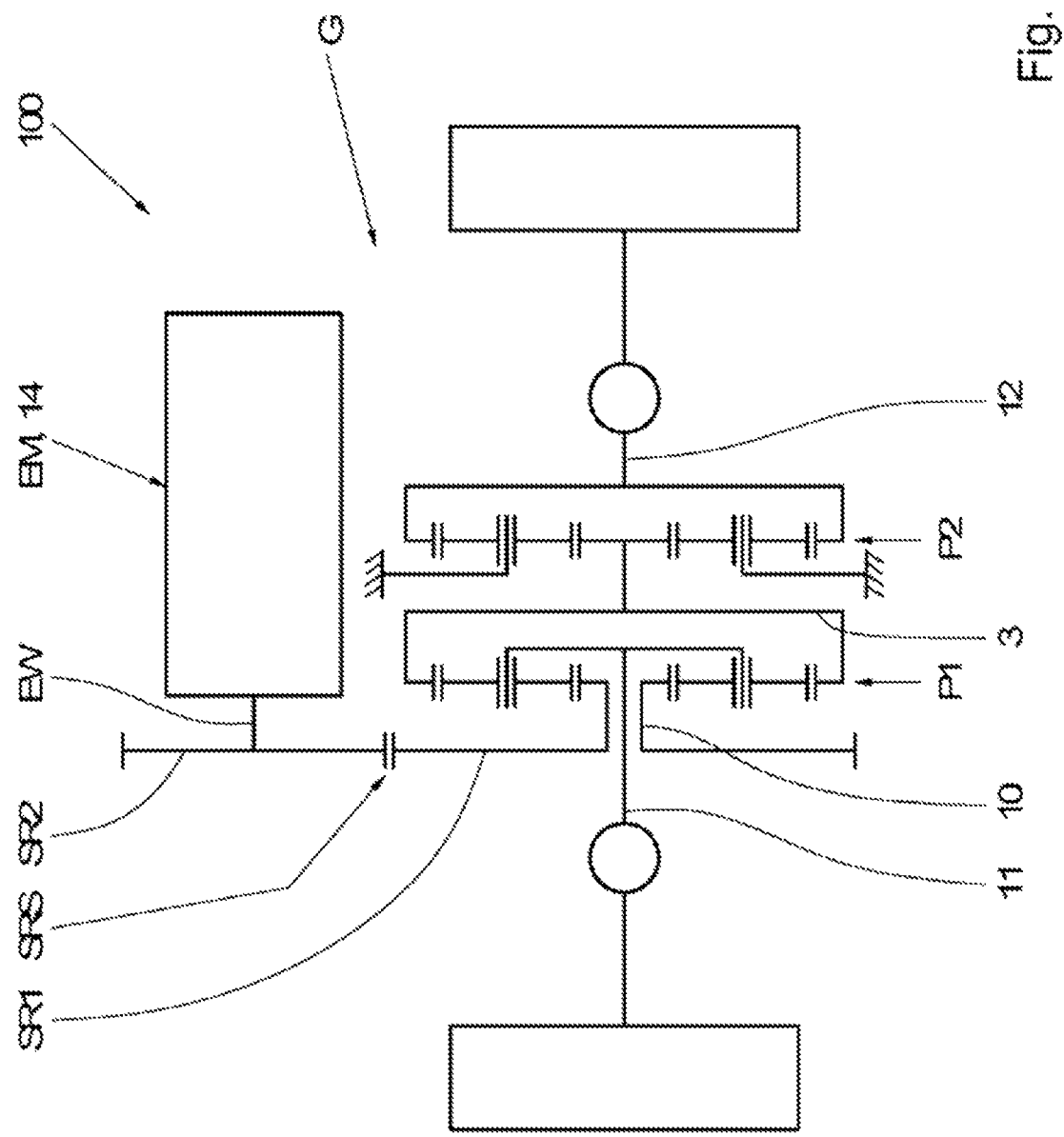

FIG. 13 shows a drivetrain 100 in a further exemplary embodiment. This embodiment is similar to the embodiment as per FIG. 11, wherein, by contrast thereto, the electric machine EM is arranged not coaxially but axially parallel with respect to the transmission G. A connection is realized here via a spur gear stage SRS, which is composed of a first spur gear SR1 and a second spur gear SR2. The first spur gear SR1 is in this case connected rotationally conjointly to the input shaft 10. The spur gear SR1 is then in tooth meshing engagement with the spur gear SR2, which is located rotationally conjointly on an input shaft EW of the electric machine EM and which, within the electric machine EM, produces the connection to the rotor (not illustrated in any more detail here) of the electric machine EM. Otherwise, the embodiment as per FIG. 13 corresponds to the embodiment as per FIG. 11, such that reference is made to the description given with regard thereto.

Figure 14:
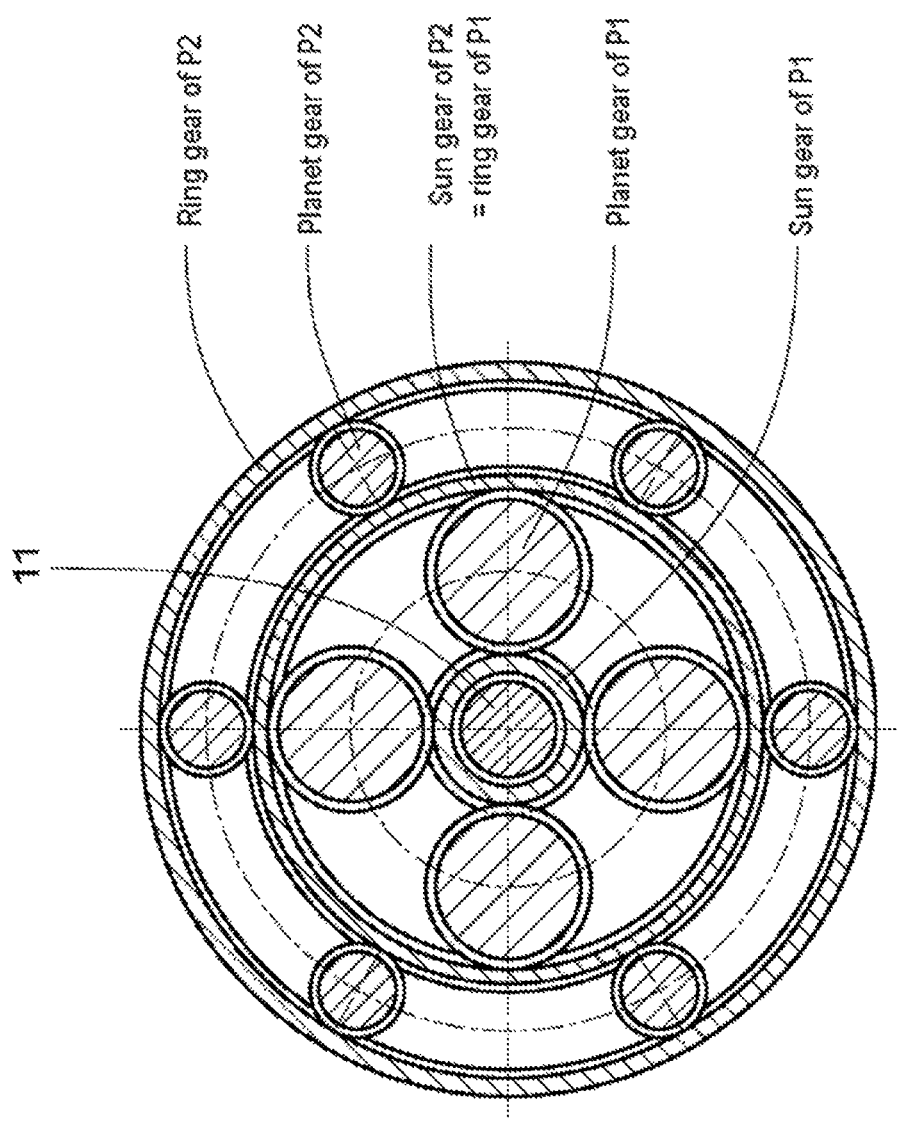
FIG. 14 is the transmission of FIG. 3 in a sectional view.

FIG. 14 shows the embodiment of the transmission G as per FIG. 3 in a sectional view. The shaft situated in the center is the output shaft 11. In this drawing, the input shaft 10 coincides with the sun gear of P1, that is to say, in other words, the input shaft 10 is connected to a sun gear of the first planetary gear set P1. The sun gear of the first planetary gear set P1 is in turn in tooth meshing engagement with planet gears of the first planetary gear set P1. The planet gears of the first planetary gear set P1 in turn mesh with the surrounding ring gear of the first planetary gear set P1, wherein the ring gear simultaneously forms the sun gear of the second planetary gear set P2. The sun gear of the second planetary gear set P2 is in turn in tooth meshing engagement with planet gears of the second planetary gear set P2. The planet gears of the second planetary gear set P2 are in turn in tooth meshing engagement with the ring gear, which surrounds the planet gears, of the second planetary gear set P2.

Figure 16:
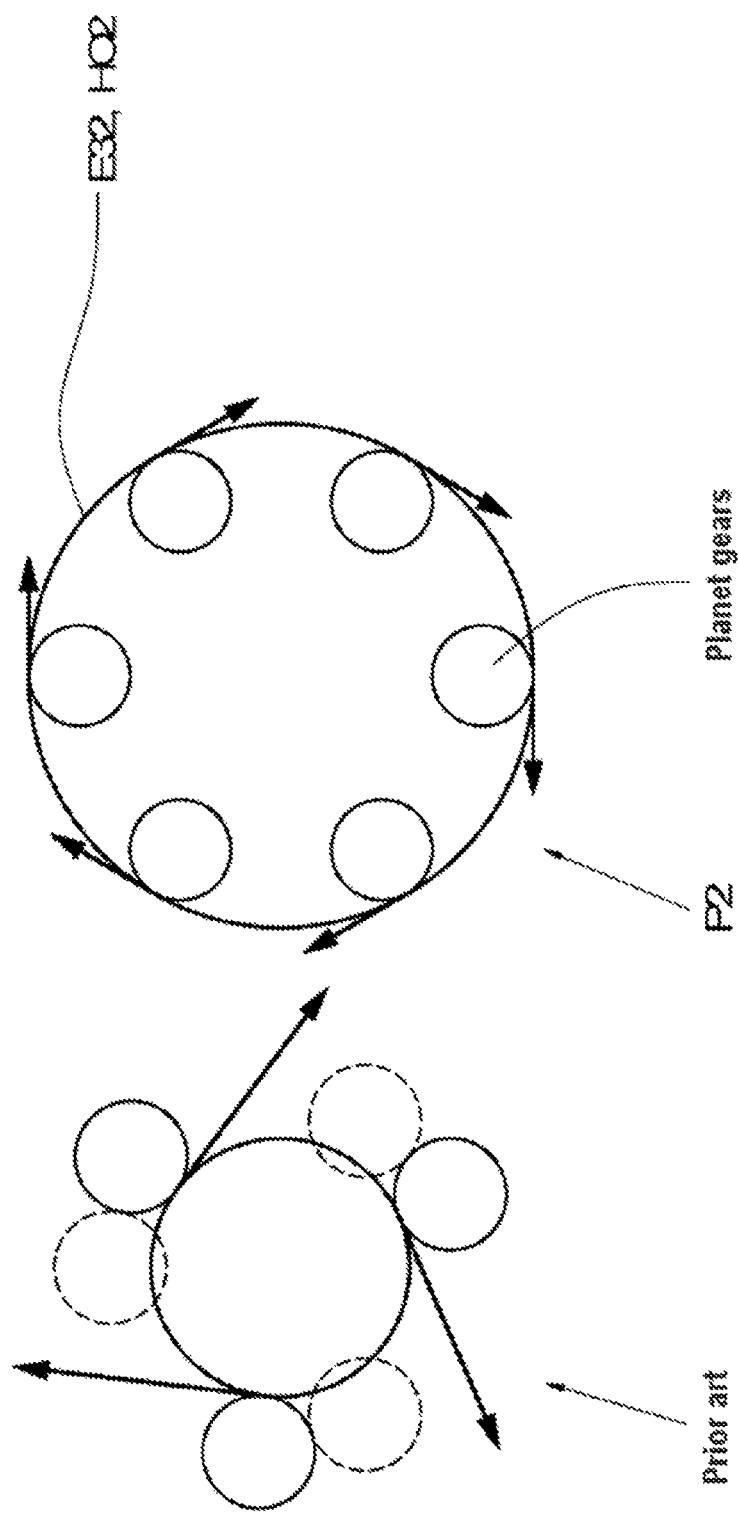

The following FIGS. 15 to 17 show the introduction of force and force support configurations of the transmission according to this invention in relation to the prior art, such as DE 10 2011 079 975 A1. The prior art is compared with the preferred embodiment with two minus planetary transmissions, as have been described inter alia in FIGS. 2 and 3. However, this consideration also applies analogously to the other embodiments.

The following generally applies to FIGS. 15 to 17:

At the first planetary gear set P1, the torque of the input shaft 10 is converted into the output torque for the first output 11. The third element E31 of the first planetary gear set P1, which is at the same time the first element E12 of the second planetary gear set P2, is driven backward by its reaction moment. The backward movement of the third element E31 is permitted, such that a proportion of the mechanical drive power, preferably 50% in the case of the transverse differential and straight-ahead travel, is conducted through the first planet set P1 into the second planet set.

Furthermore, the backward rotation causes the speed ratio with respect to the first output (11) to be increased (static transmission ratio i0=−3 would allow only a speed ratio of i=4 in the case of a fixed ring gear).

In the second planetary gear set P2, the direction of rotation (backward) introduced at the first element (E12) is, with the aid of a housing support (E22), reversed (forward) into the output movement of the second output (12). Here, the torque introduced into the second planetary set P2 and the torque conducted out to the second output (12) are summed to give the housing support torque. Here, the second planet set P2 transmits only that proportion of the mechanical power that is conducted to the second output (12), typically 50%. Only a proportion of the power is applied to the second planetary set P2, such that the overall efficiency is positively influenced.

In the prior art, a torque conversion usually takes place with the aid of a housing support. The reaction moment of the transmission gearing is in this case conducted directly into the housing and does not serve to generate the second output torque. The result is that a transmission must firstly be configured for the sum torque of the two output shafts (generally double the torque). A separate differential transmission is then required to divide this sum torque, which is not required in this form at any location, into two output torques again.

The individual FIGS. 15 to 18 specifically show the following:

FIG. 15 schematically shows the first planetary gear set P1 of the transmission G (right) and a first stage of the spur gear differential from the prior art (left). The introduction of force from the planet gears to the sun gear takes place in parallel via 3 static, that is to say fixed, tooth meshing engagement points. The output to the first output shaft takes place via the sun gear.

By contrast to this, the introduction of force according to the preferred embodiment takes place in parallel via eight moving, that is to say rotating, tooth meshing engagement points. There are four tooth meshing engagement points between sun gear SO1 and four planet gears. Four further tooth meshing engagement points act between a respective planet gear and the ring gear HO1 (not illustrated). The output to the first output shaft 11 takes place via the planet gear carrier PT1. The technical effect lies in the significantly lower tooth forces that act on the first planetary gear set.

FIG. 16 schematically shows the second planetary gear set P2 of the transmission G (right) and a second stage of the stepped planet from the prior art (left). The introduction of force from the planet gears to the sun gear takes place in parallel via 3 static, that is to say fixed, tooth meshing engagement points. The output to the second output shaft takes place via the sun gear.

By contrast to this, the introduction of force into the second planetary gear set P2 according to the preferred embodiment takes place in parallel via 6 moving, that is to say rotating, tooth meshing engagement points. The six tooth meshing engagement points act in each case between one of the six planet gears and the ring gear HO2. The fixed planet carrier PT2, which carries the six planet gears and the sun gear SO2, are not illustrated. The output to the second output shaft 12 takes place via the ring gear HO2. The technical effect lies in the significantly lower tooth forces that act on the second planetary gear set owing to the larger effective diameter and owing to the larger possible number of planets.

FIG. 17 schematically shows the introduction of the supporting torque into the housing. The introduction of force in the case of the stepped planet according to the prior art (left) takes place into a fixed ring gear via 3 parallel tooth meshing engagement points.

The introduction of force according to the preferred embodiment takes place into the fixed planet carrier PT2 via 12 parallel tooth meshing engagement points. Six tooth meshing engagement points act between the sun gear SO2 and the six planet gears of the second planetary gear set. The six other tooth meshing engagement points act between each planet gear of the second planetary gear set and the ring gear HO2. The technical effect lies in the significantly lower tooth forces that act on the second planet carrier PT2.

Figure 18:
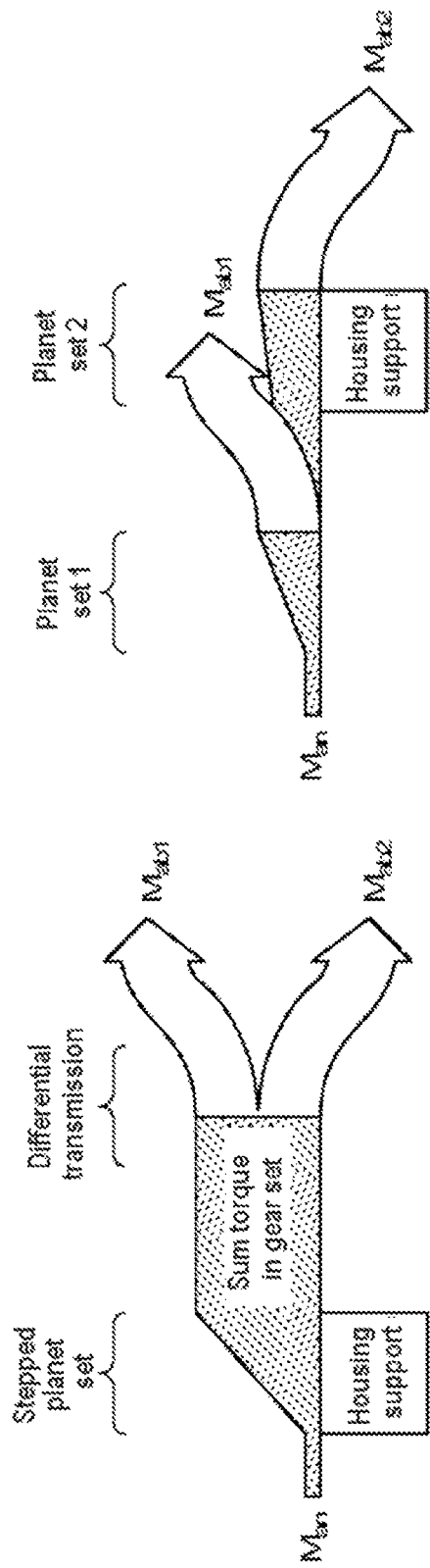

FIG. 18 shows the principle illustrated in more detail in FIGS. 15 to 17 in a further view. The figure symbolically illustrates the torques in terms of magnitude on their path through the transmission. Directions of rotation are not apparent from this.

The stepped planet set according to the prior art (left) generates the full output torque, that is to say the sum torque of both wheels, from one input torque $M_{an}$. The differential divides this high torque into two half wheel torques $M_{an1}$ and $M_{an2}$.

The greatest torque in the gear set according to the invention (right) corresponds to the output torque of a single gear. Only the housing support has a high torque factor in accordance with physical principles.

FIG. 19 gives an overview of the calculation rule for the static transmission ratio of the individual embodiments. These each give rise, if transmission losses are disregarded, to an output torque of equal magnitude and with the same sign at both output shafts (11, 12). $i_{o1}$ denotes the static transmission ratio of the second planetary gear set P1. $i_{o2}$ denotes the static transmission ratio of the second planetary gear set P2. One of the planetary gear set configurations with corresponding static transmission ratio may be selected depending on the use of the transmission.

Figure 20:
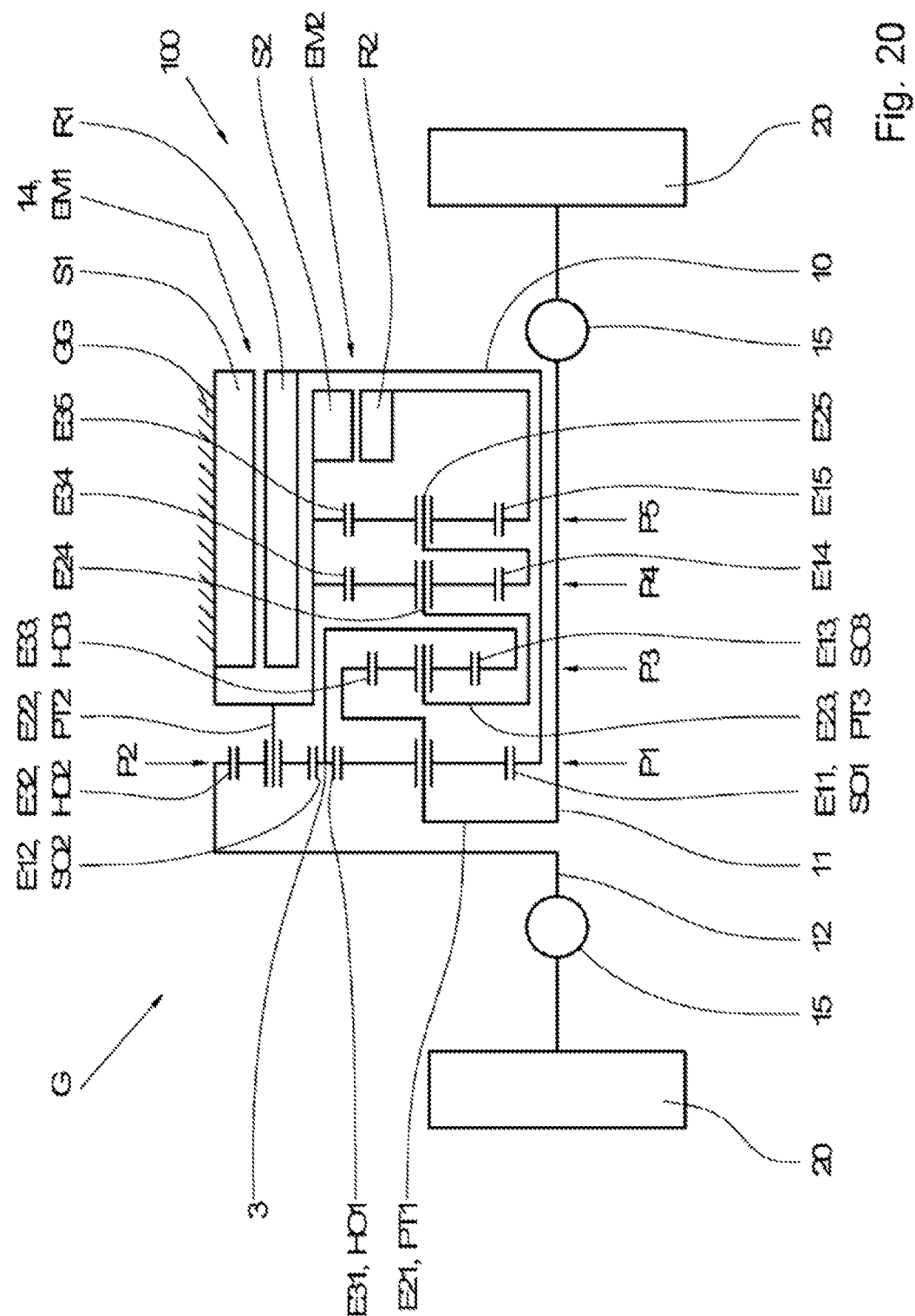

FIG. 20 shows a drivetrain 100 of a vehicle having a transmission G with a torque vectoring superposition unit in a first preferred embodiment. The drivetrain 100 is based on the drivetrain known from FIG. 10, wherein, by contrast thereto, no additional planetary gear P33 is provided in order to increase the rotational speed of the drive machine. The planetary gear sets P1, P2 accordingly constitute the radially stacked arrangement of two minus planetary gear sets, which is likewise known from FIG. 3. This arrangement is particularly highly suitable for the provision of a torque vectoring superposition unit, because the radially stacked arrangement saves axial installation space, which can be used for the torque vectoring superposition unit.

The torque vectoring superposition unit comprises a transmission gearing P3 in the form of a third planetary gear set and an actuator, which in the present case is configured as an electric machine with a stator and a rotor. In the following, the electric machine provided as the drive machine of the transmission G will be referred to as first electric machine EM1, whereas the electric machine of the torque vectoring superposition unit will be referred to as second electric machine EM2.

The transmission gearing P3 of the torque vectoring superposition unit is, in FIG. 20, designed as a minus planetary transmission with multiple elements. A first element E13 of the third planetary gear set P3 is connected rotationally conjointly to the connecting shaft 3. A second element E23 of the third planetary gear set P3 is connected to a rotor R2 of the electric machine EM2. A third element E33 of the third planetary gear set P3 is connected rotationally conjointly to an element of the first planetary gear set P1, said element being configured in the present case as a planet carrier PT1, which in turn is connected rotationally conjointly to the first output shaft 11.

The first element E13 is configured as a sun gear SO3, the second element E23 as a planet carrier PT3 and the third element E33 as a ring gear HO3.

In other words, the transmission gearing P3 is configured as a 3-shaft transmission, wherein the planet carrier PT3 is connected to the rotor R2, the ring gear HO3 is connected rotationally conjointly to the output 11 of the first planetary gear set P1, and the sun gear SO3 is connected rotationally conjointly to the connecting shaft 3, that is to say that shaft 3 which connects the two planetary gear sets P1 and P2 to one another. The connecting shaft 3 is formed by the ring gear HO1 of the first planetary gear set P1 and the sun gear SO2 of the second planetary gear set P2.

The torque vectoring superposition unit, that is to say the third planetary gear set P3 and the second electric machine EM2, are arranged coaxially with respect to the two output shafts 11, 12 of the transmission G. As can be clearly seen, the third planetary gear set P3 is arranged axially spaced apart from the radially stacked planetary gear sets P1, P2.

Between the third planetary gear set P3 and the second electric machine EM2, there are provided two optional transmission gearings P4, P5 which in the present case are designed as minus planetary transmissions. A higher speed ratio of the rotor rotational speed can be made available for the third planetary transmission by the transmission gearing.

The two planetary transmissions P4, P5 have multiple elements. A first element E14 of the fourth planetary gear set P4 is connected rotationally conjointly to a second element E25 of the fifth planetary gear set P5. A second element E24 of the fourth planetary gear set P4 is connected rotationally conjointly to the planet carrier PT3 of the third planetary gear set P3. A third element E34 of the fourth planetary gear set P4, and likewise a third element E35 of the fifth planetary gear set P5, are fixed. The first element E15 of the fifth planetary gear set P5 is connected to the rotor R2. The respective first elements are configured as sun gears, the respective second elements as planet carriers and the respective third elements as ring gears.

As can also be seen from FIG. 20, the ring gears HO4, HO5 and the planet carrier of the second planetary gear set P2 are fixed to the stator S1 as a non-rotatable structural element GG. The static transmission ratio may for example be configured as follows:

$$i_{0\_}P1=-3.00$$

$$i_{0\_}P2=-1.33$$

$$i_{0\_}P3=-1.33$$

Figure 21:
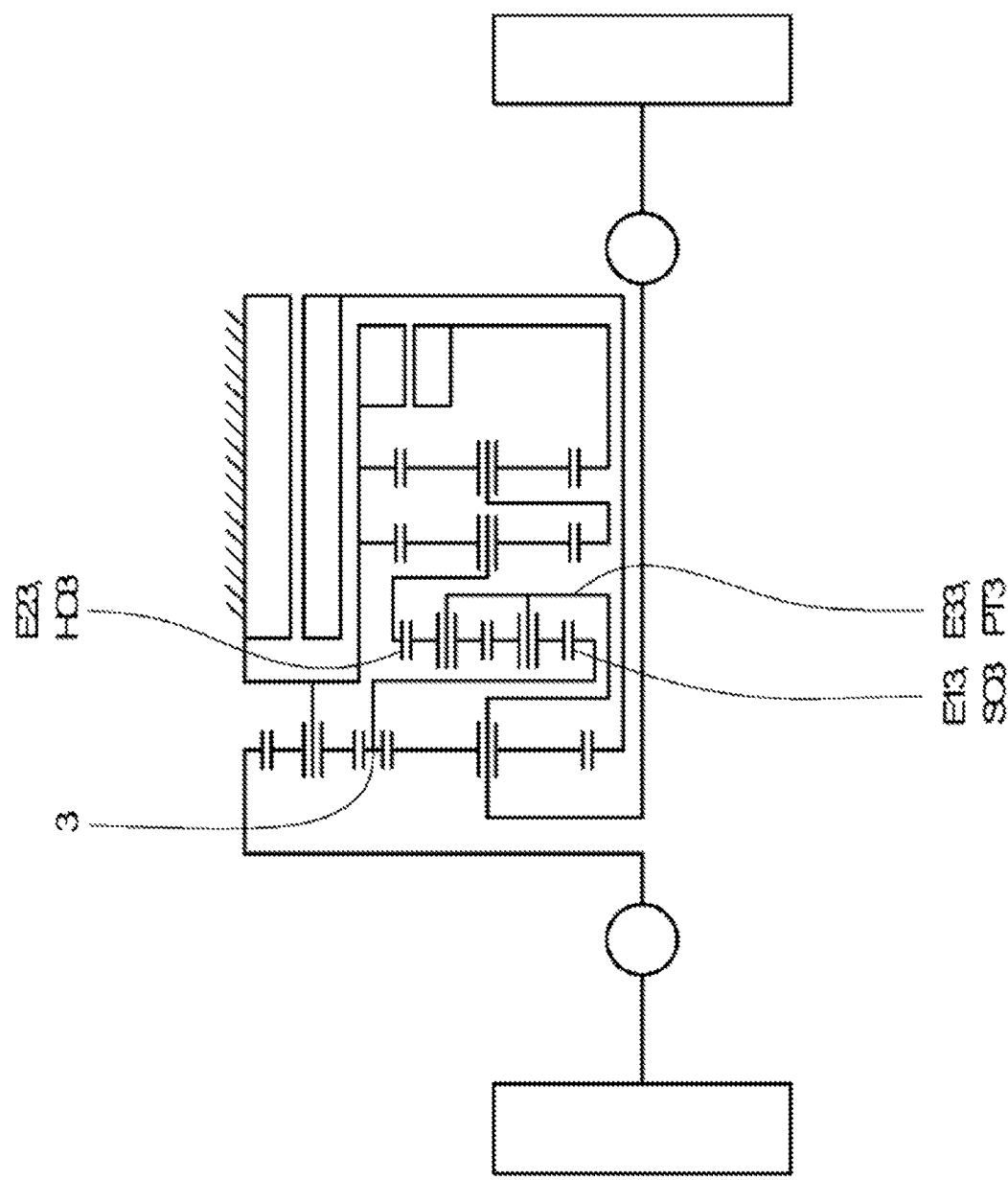

FIG. 21 shows a drivetrain 100 of a vehicle having a transmission G with a torque vectoring superposition unit in a second preferred embodiment. By contrast to FIG. 20, the third planetary gear set P3 is designed as a plus planetary gear set, wherein the planet carrier and ring gear connections have been interchanged and the magnitude of the static transmission ratio has been increased by one. A functionally identical transmission is thus realized.

The third element E33 of the third planetary gear set P3 is accordingly in the form of a planet carrier PT3, whereas the second element E23 of the third planetary gear set P3 is in the form of a ring gear HO3. The ring gear HO3 is connected rotationally conjointly to the planet carrier of the fourth planetary gear set. The planet carrier PT3 is connected to the output 11 of the first planetary gear set P2. The sun gear SO3 is still connected to the connecting shaft 3. It should also be noted here that the two transmission gearings P4, P5 are optional. The static transmission ratio may for example be configured as follows:

$$i_{0\_}P1=-3.00$$

$$i_{0\_}P2=-1.33$$

$$i_{0\_}P3=+2.33$$

Otherwise, the embodiment as per FIG. 21 corresponds to the embodiment as per FIG. 20, such that reference is made to the description given with regard thereto.

Figure 22:
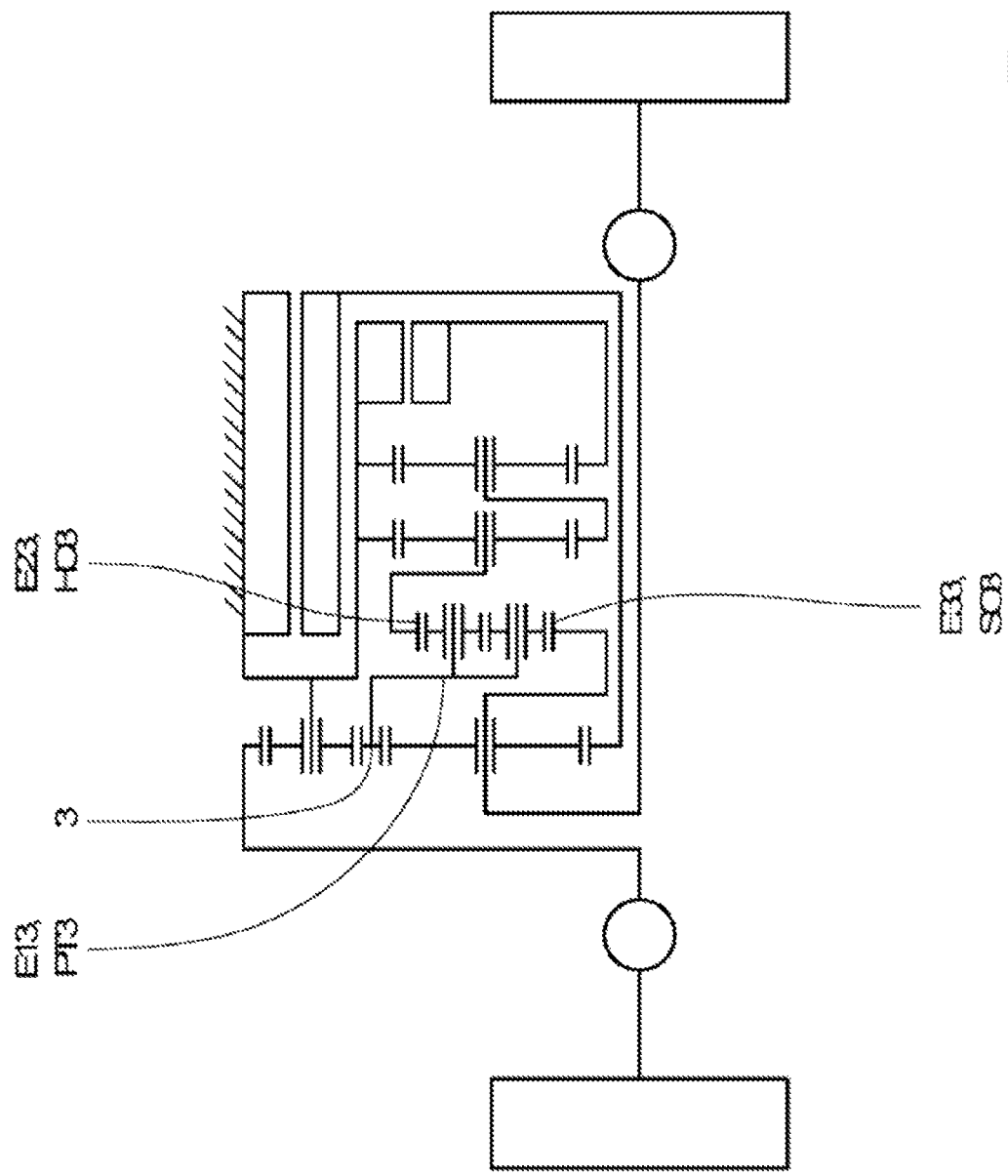

FIG. 22 shows a drivetrain 100 of a vehicle having a transmission G with a torque vectoring superposition unit in a third preferred embodiment. By contrast to FIG. 20, the third planetary gear set P3 is designed as a plus planetary gear set, wherein the connections of the elements and the required static transmission ratio have been adapted.

The third element E33 of the third planetary gear set P3 is configured as a sun gear SO3 and is connected to the output 11. The first element E13 of the third planetary gear set P3 is configured as planet carrier PT3 and is connected rotationally conjointly to the connecting shaft 3. The second element E23 of the third planetary gear set P3 is in the form of a ring gear and is connected to the rotor R2 via the two optional transmission gearings P4, P5. The static transmission ratio may for example be configured as follows:

$$i_{0\_}P1=-3.00$$

$$i_{0\_}P2=-1.33$$

$$i_{0\_}P3=+1.75$$

Otherwise, the embodiment as per FIG. 22 corresponds to the embodiment as per FIG. 21 or 20, such that reference is made to the description given with regard thereto.

Figure 23:
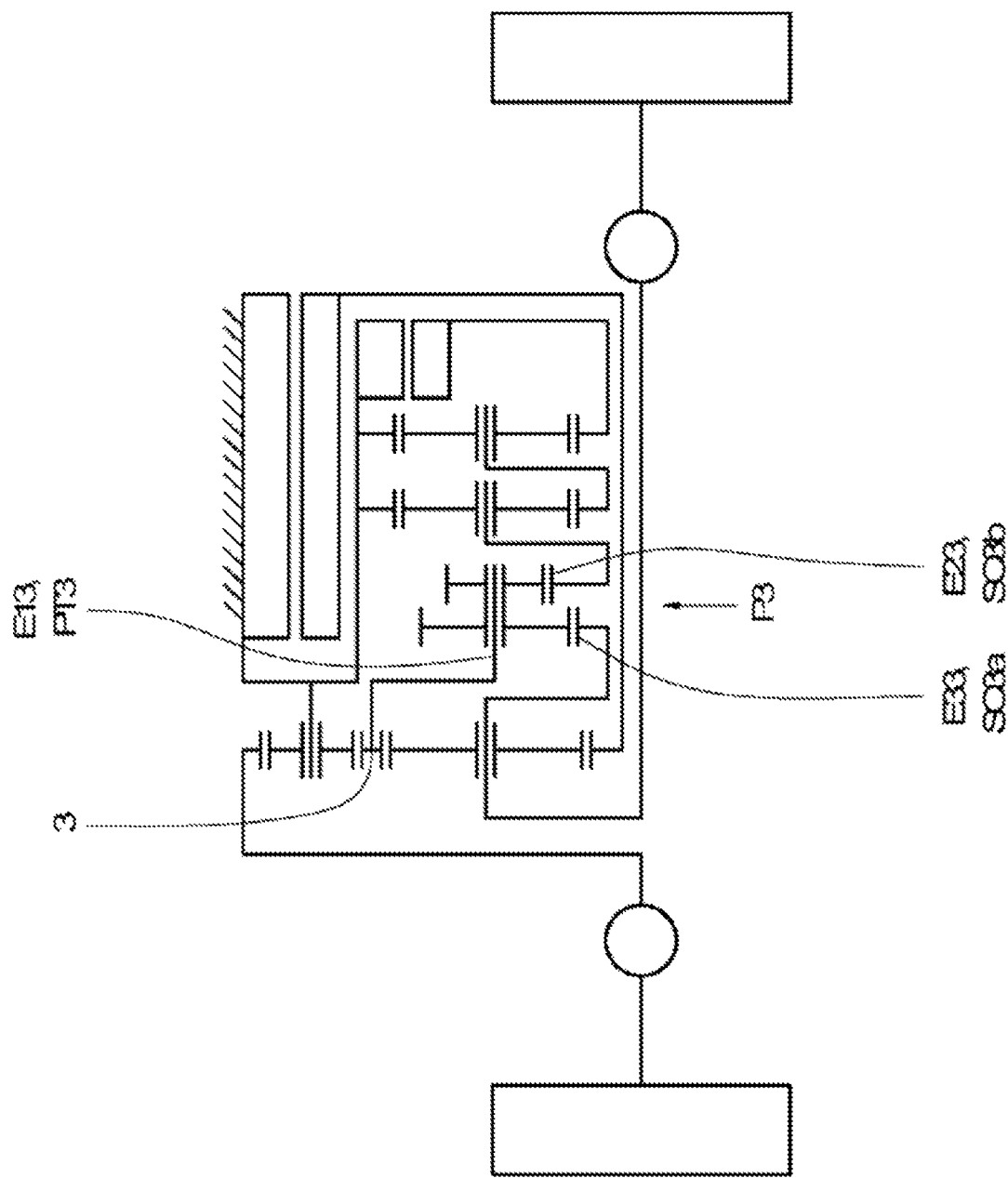

FIG. 23 shows a drivetrain 100 of a vehicle having a transmission G with a torque vectoring superposition unit in a fourth preferred embodiment. By contrast to FIG. 22, the third planetary gear set P3 is designed as a plus planetary gear set with a stepped planet design. Here, two fixed gears of different sizes and mounted on the planet carrier PT3 are in tooth meshing engagement with a respective sun gear. This thus constitutes a planetary stage with two sun gear connections. A relatively large first fixed gear meshes with a first sun gear SO3a. A relatively small second fixed gear meshes with a second sun gear SO3b.

The third element E33 of the third planetary gear set P3 is configured as the sun gear SO3a and is connected to the output 11. The first element E13 of the third planetary gear set P3 is configured as planet carrier PT3 and is connected rotationally conjointly to the connecting shaft 3. The second element E23 of the third planetary gear set P3 is in the form not of a ring gear but of the sun gear SO3b and is connected to the rotor R2 via the two optional transmission gearings P4, P5. The static transmission ratio may for example be configured as follows:

$$i_{0\_}P1=-3.00$$

$$i_{0\_}P2=-1.33$$

$$i_{0\_}P3=+1.75$$

Otherwise, the embodiment as per FIG. 23 corresponds to the embodiment as per FIG. 21 or 20, such that reference is made to the description given with regard thereto.

Figure 24:
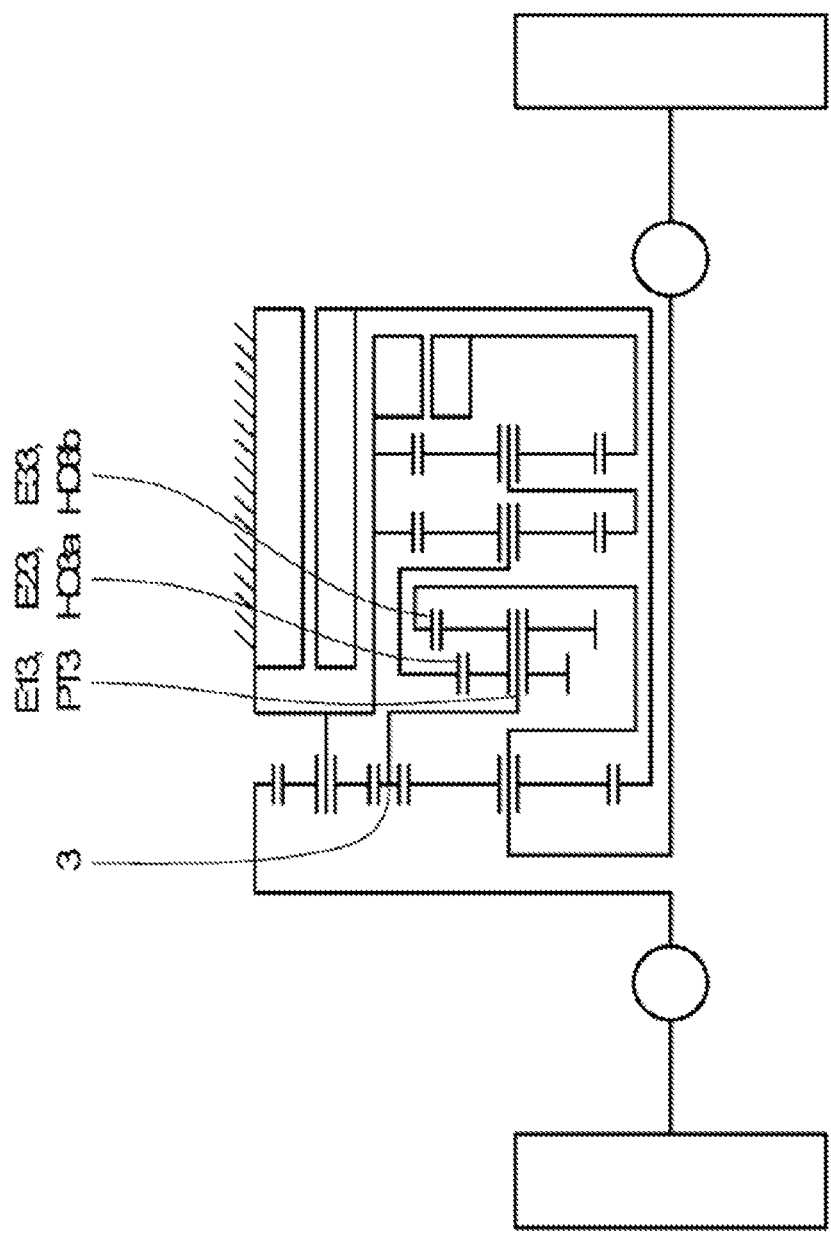

FIG. 24 shows a drivetrain 100 of a vehicle having a transmission G with a torque vectoring superposition unit in a fifth preferred embodiment. By contrast to FIG. 23, the connections of the third planetary gear set are implemented not by two sun gears but by two ring gears HO3a and HO3b. The smaller of the two fixed gears of the planetary stage is in tooth meshing engagement with the ring gear HO3a, while the larger of the two fixed gears is in tooth meshing engagement with the ring gear HO3b. This is also referred to as a planetary stage with two ring gear connections. The first element E13 of the third planetary gear set P3 is still configured as a planet carrier PT3 and connected rotationally conjointly to the connecting shaft 3.

The second element E23 of the third planetary gear set P3 is in the form of the ring gear HO3a and is connected to the rotor R2 via the two optional transmission gearings P4, P5. The third element E33 of the third planetary gear set P3 is accordingly configured as a ring gear HO3b and is connected to the output 12. The static transmission ratio may for example be configured as follows:

$$i_{0\_}P1=-3.00$$

$$i_{0\_}P2=-1.33$$

$$i_{0\_}P3=+1.75$$

Otherwise, the embodiment as per FIG. 24 corresponds to the embodiment as per FIG. 23, such that reference is made to the description given with regard thereto.

Figure 25:
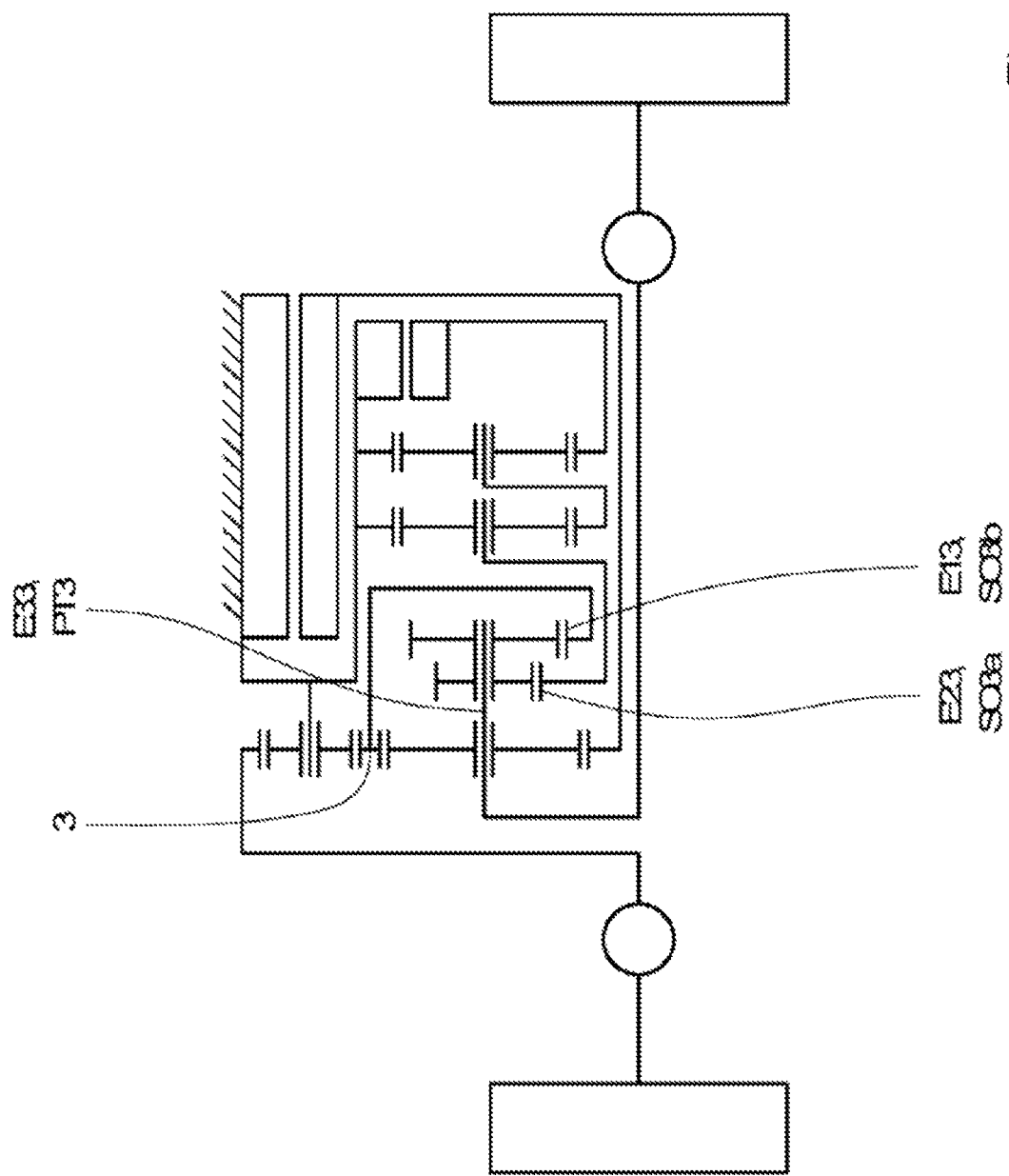

FIG. 25 shows a drivetrain 100 of a vehicle having a transmission G with a torque vectoring superposition unit in a fifth preferred embodiment. By contrast to FIG. 21, the third planetary gear set P3 is designed as a plus planetary gear set with a stepped planet design.

Here, two fixed gears of different sizes and mounted on the planet carrier PT3 are in tooth meshing engagement with a respective sun gear. This thus constitutes a planetary stage with two sun gear connections. A relatively small first fixed gear meshes with a first sun gear SO3a. A relatively large second fixed gear meshes with a second sun gear SO3b.

The third element E33 of the third planetary gear set P3 is configured as the planet carrier PT3 and is connected to the output 12. The first element E13 of the third planetary gear set P3 is configured as sun gear SO3b and is connected rotationally conjointly to the connecting shaft 3. The second element E23 of the third planetary gear set P3 is in the form of sun gear SO3a and is connected to the rotor R2 via the two optional transmission gearings P4, P5. The static transmission ratio may for example be configured as follows:

$$i_{0\_P1} = -3.00$$

$$i_{0\_P2} = -1.33$$

$$i_{0\_P3} = +2.33$$

Otherwise, the embodiment as per FIG. 25 corresponds to the embodiment as per FIG. 21 or 20, such that reference is made to the description given with regard thereto.

Figure 26:
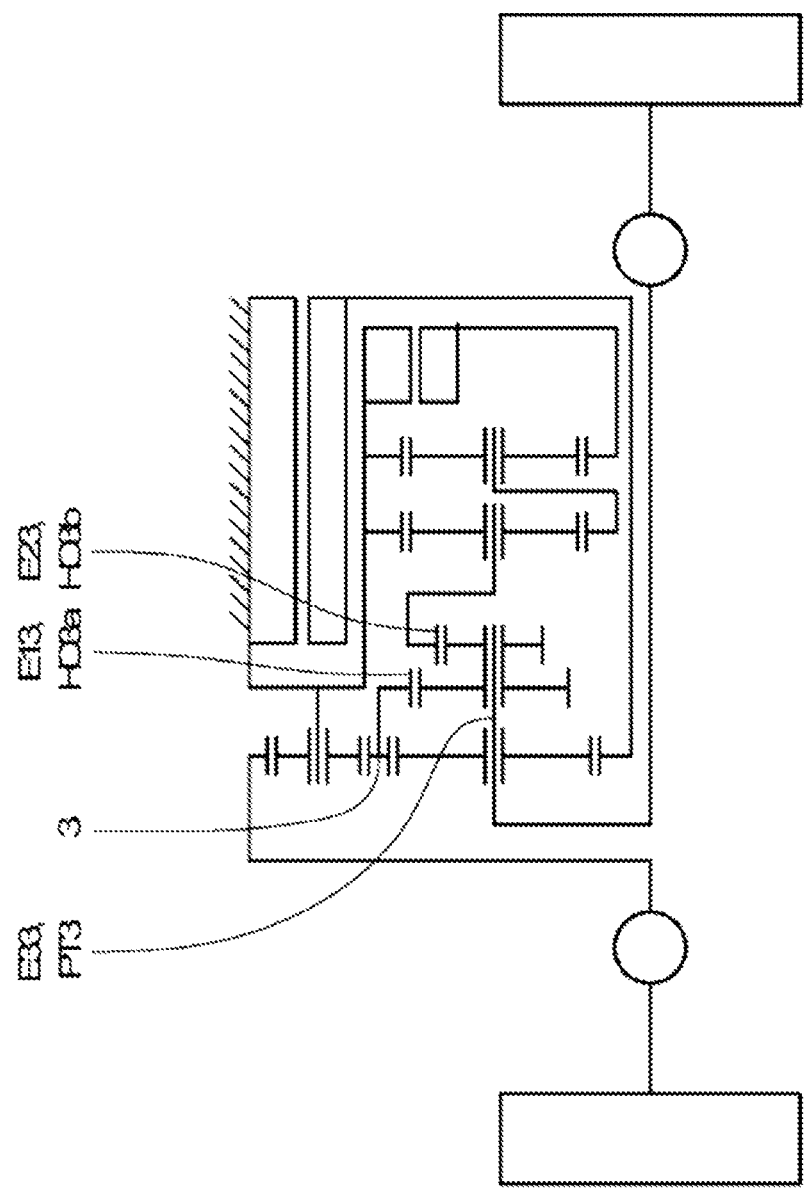

FIG. 26 shows a drivetrain 100 of a vehicle having a transmission G with a torque vectoring superposition unit in a sixth preferred embodiment. By contrast to FIG. 25, the connection of the third planetary gear set P3 is implemented not by sun gears but by two ring gears HO3a and HO3b. Here, two fixed gears of different sizes and mounted on the planet carrier PT3 are in tooth meshing engagement with a respective ring gear. This thus constitutes a planetary stage with two ring gear connections. A relatively large first fixed gear meshes with a first ring gear HO3a. A relatively small second fixed gear meshes with a second ring gear HO3b.

The first element E13 of the third planetary gear set P3 is configured as ring gear HO3a and is connected rotationally conjointly to the connecting shaft 3. The second element E23 of the third planetary gear set P3 is in the form of the ring gear HO3b and is connected to the rotor R2 via the two optional transmission gearings P4, P5. The third element E33 of the third planetary gear set P3 is still configured as a planet carrier PT3 and connected to the output 12. The static transmission ratio may for example be configured as follows:

$$i_{0\_P1} = -3.00$$

$$i_{0\_P2} = -1.33$$

$$i_{0\_P3} = +2.33$$

Otherwise, the embodiment as per FIG. 26 corresponds to the embodiment as per FIG. 25, such that reference is made to the description given with regard thereto.

The advantages of the torque vectoring superposition unit or the transmission G with the torque vectoring superposition unit according to the embodiments of FIGS. 20 to 26 lie in a compact design and good efficiency. The torque vectoring superposition unit is of technically low complexity in terms of construction and is thus inexpensive. Furthermore, the potential can be fully exploited by way of the connection of the planetary transmission P3 to the connecting shaft 3.

The potential of the application of force to the connecting shaft 3 lies in the fact that the planetary gear set P3 can be of simpler design owing to the different directions of rotation. If this were to act between two shafts running in synchronism, as in the prior art, the outlay complexity would be greater. Furthermore, in a conventional differential, the left-hand and right-hand side shafts are generally difficult to bind owing to the drive action on the differential cage.

Figure 27:
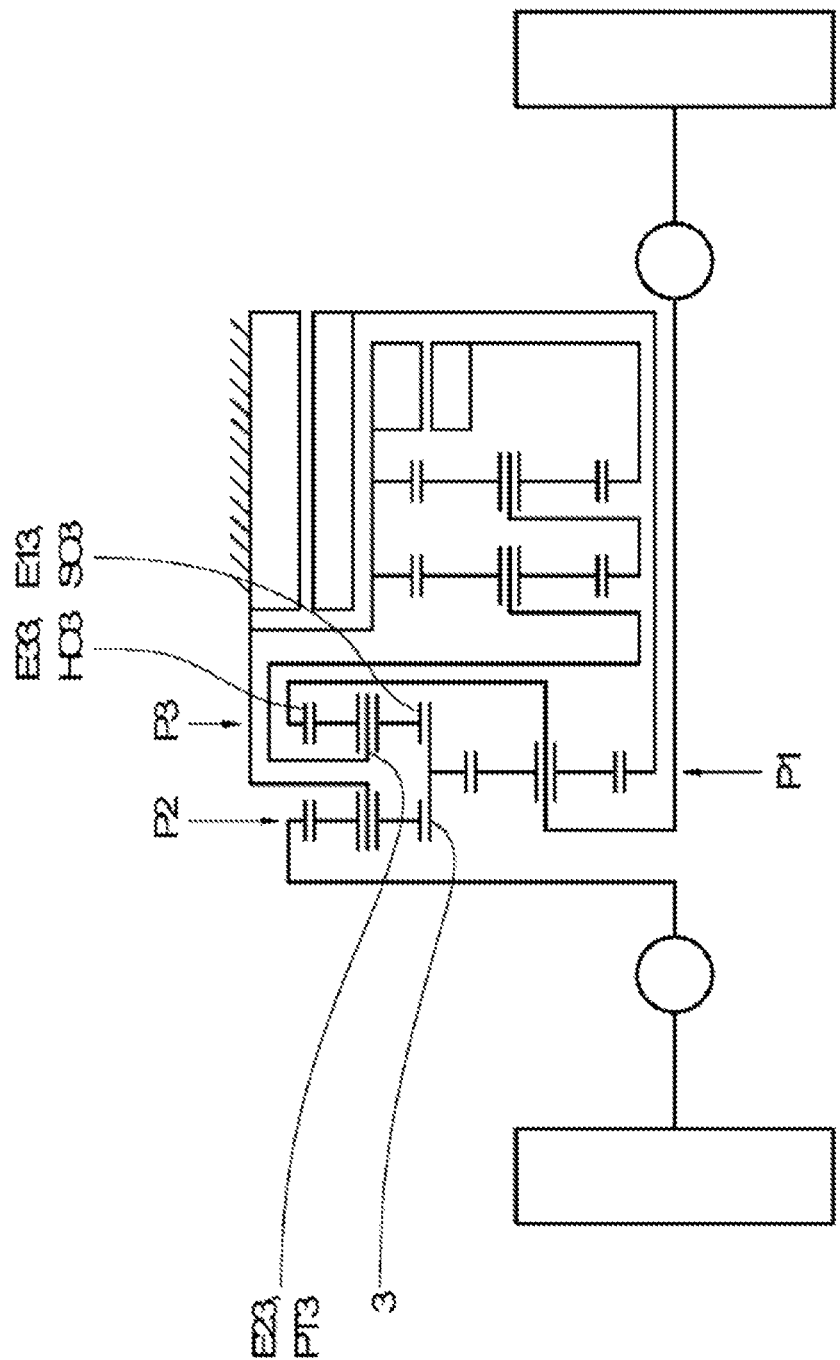
Figure 28:
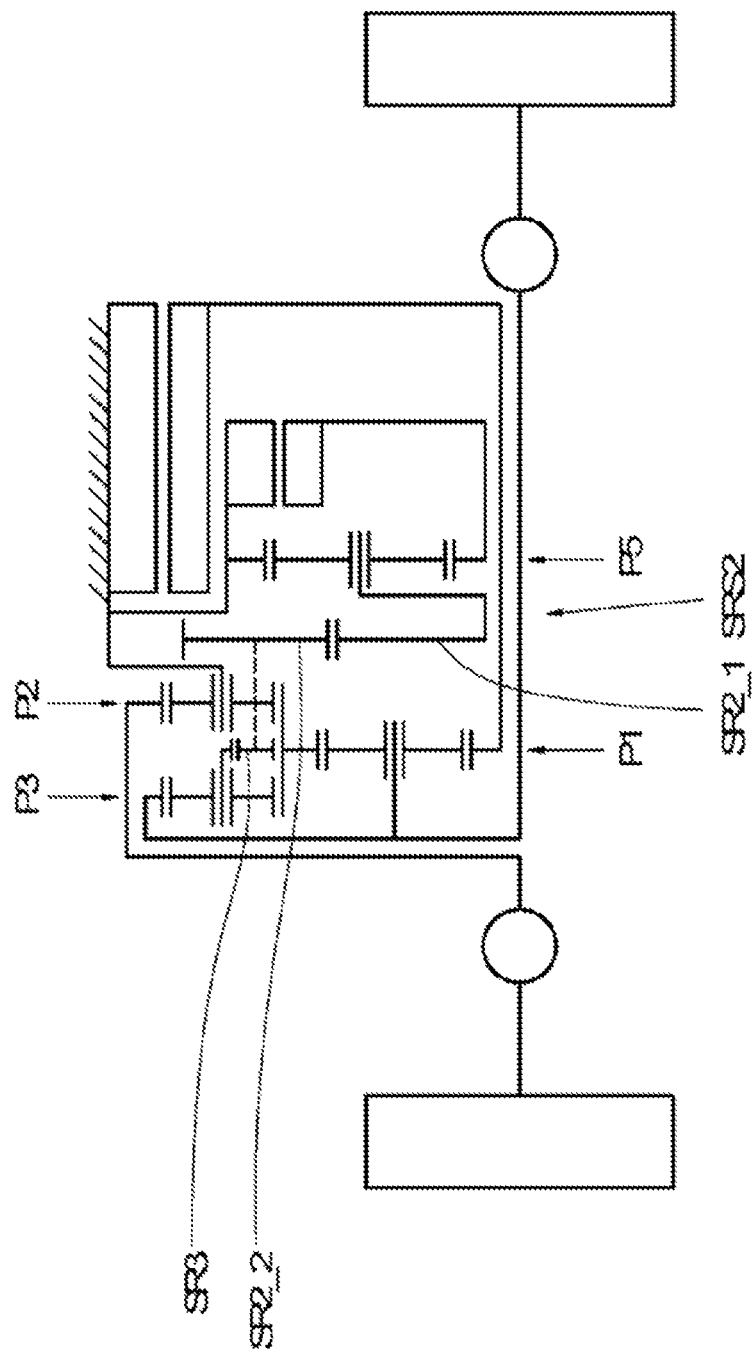

FIGS. 27 to 29 show further preferred variants based on FIG. 20. In these variants, the second and third planetary gear sets P2, P3 are arranged radially outside the first planetary gear set P1. The third planetary gear set P3 is arranged axially spaced from the second planetary gear set P2. The connections are maintained here. Again, the two transmission gearings P4, P5 are optionally provided. The embodiments of FIGS. 27 to 29 are more complex in terms of construction than the embodiments of FIGS. 20 to 26.

The variant according to FIG. 27 shows an axial sequence as follows: second planetary gear set P2, third planetary gear set P3, second electric machine EM2.

The variant according to FIGS. 28 and 29 shows an axial sequence in which the two planetary gear sets P2, P3 have been interchanged.

For this purpose, the planet carrier PT3 has an external toothing (not illustrated in any more detail) and meshes with a spur gear SR3. The tooth meshing may however also take place by way of an internal toothing on the planet carrier. The spur gear is connected rotationally conjointly to a spur gear SR2_2, wherein a part of this connection is realized through the planet carrier PT2, which is fixed to the housing, of the second planetary gear set P2. The spur gear SR2_2 in turn meshes with a spur gear SRS2_1. The two spur gears SRS2_1 and SRS2_2 form a spur gear stage SRS2 and, as a transmission gearing, replace the fourth planetary transmission P4. The spur gear SRS2_1 is connected rotationally conjointly to the planet carrier of the fifth planetary transmission.

In the illustrated FIGS. 20 to 29, the transmission gearings P4, P5, SRS2 are illustrated as being integrated into the rotor R2. However, it is equally preferred to arrange the elements axially adjacent to one another. Axially parallel arrangements of the electric machines are additionally conceivable. All of the solutions in FIGS. 20 to 29 have in common the fact that the third transmission gearing P3 engages firstly on the output of the first planetary set P1 and secondly on the connecting shaft 3 between the two planetary sets P1 and P2.

The invention has been described and explained comprehensively with reference to the drawings and the description. The description and explanation are to be understood as examples and not as being limiting. The invention is not limited to the disclosed embodiments. Other embodiments or variations will become apparent to a person skilled in the art from the use of the present invention and from a close analysis of the drawings, the disclosure and the following claims.

In the patent claims, the words "comprising" and "having" do not exclude the presence of further elements or steps. The indefinite article "a" or "an" does not exclude the presence of a multiplicity. A single element or a single unit may perform the functions of several of the units mentioned in the patent claims. The mere mention of certain measures in several different dependent patent claims should not be understood to mean that a combination of these measures cannot likewise be advantageously used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A transmission having a torque vectoring superposition unit, comprising:
    an input shaft;
    a first output shaft;
    a second output shaft;
    a first planetary gear set; and
    a second planetary gear set connected to the first planetary gear set,
    wherein the first planetary gear set and the second planetary gear set each comprise multiple elements,
    wherein the input shaft, the first and second output shafts, the planetary gear sets, and elements thereof are arranged and are configured such that:
    a torque introduced via the input shaft is converted and divided between the two output shafts in a defined ratio, and a generation of a sum torque is prevented,
    wherein at least one element of the first planetary gear set is connected rotationally conjointly to another element of the second planetary gear set via a connecting shaft; and
    a further element of the second planetary gear set is fixed to a non-rotatable structural element;
    the torque vectoring superposition unit comprising a third planetary gear set and an actuator, wherein:
        a first element of the third planetary gear set is connected rotationally conjointly to the connecting shaft,
        a second element of the third planetary gear set is connected to the actuator, and
        a third element of the third planetary gear set is connected rotationally conjointly to a second element of the first planetary gear set, which in turn is connected rotationally conjointly to the first output shaft.

2. The transmission as claimed in claim 1, wherein the actuator is an electric motor or a hydraulic motor.

3. The transmission as claimed in claim 1, wherein the third planetary gear set is arranged axially adjacent to the first planetary gear set.

4. The transmission as claimed in claim 1, wherein the third planetary gear set is arranged radially outside the first planetary gear set.

5. The transmission as claimed in claim 1, wherein the third planetary gear set is a minus planetary gear set.

6. The transmission as claimed in claim 1, wherein the third planetary gear set is a plus planetary gear set.

7. The transmission as claimed in claim 1, wherein the third planetary gear set is a stepped-planet construction.

8. The transmission as claimed in claim 1, wherein, to apply a speed ratio to a rotational speed of the actuator, at least one transmission gearing is arranged between the second element of the third planetary gear set and the actuator.

9. The transmission as claimed in claim 8, wherein, to apply a speed ratio to an actuator rotational speed, two transmission gearings are arranged between the second element of the third planetary gear set and the actuator.

10. A drivetrain having a transmission having a torque vectoring superposition unit, comprising:
    an input shaft;
    a first output shaft;
    a second output shaft;
    a first planetary gear set; and
    a second planetary gear set connected to the first planetary gear set,
    wherein the first planetary gear set and the second planetary gear set each comprise multiple elements,
    wherein the input shaft, the first and second output shafts, the planetary gear sets, and elements thereof are arranged and are configured such that:
    a torque introduced via the input shaft is converted and divided between the two output shafts in a defined ratio, and a generation of a sum torque is prevented,
    wherein at least one element of the first planetary gear set is connected rotationally conjointly to another element of the second planetary gear set via a connecting shaft; and
    a further element of the second planetary gear set is fixed to a non-rotatable structural element;
    the torque vectoring superposition unit comprising a third planetary gear set and an actuator, wherein:
        a first element of the third planetary gear set is connected rotationally conjointly to the connecting shaft,
        a second element of the third planetary gear set is connected to the actuator, and
        a third element of the third planetary gear set is connected rotationally conjointly to a second element of the first planetary gear set, which in turn is connected rotationally conjointly to the first output shaft.

11. A vehicle having a transmission having a torque vectoring superposition unit, comprising:
    an input shaft;
    a first output shaft;
    a second output shaft;
    a first planetary gear set; and
    a second planetary gear set connected to the first planetary gear set,
    wherein the first planetary gear set and the second planetary gear set each comprise multiple elements,
    wherein the input shaft, the first and second output shafts, the planetary gear sets, and elements thereof are arranged and are configured such that:
    a torque introduced via the input shaft is converted and divided between the two output shafts in a defined ratio, and a generation of a sum torque is prevented,
    wherein at least one element of the first planetary gear set is connected rotationally conjointly to another element of the second planetary gear set via a connecting shaft; and
    a further element of the second planetary gear set is fixed to a non-rotatable structural element;
    the torque vectoring superposition unit comprising a third planetary gear set and an actuator, wherein:

a first element of the third planetary gear set is connected rotationally conjointly to the connecting shaft,
a second element of the third planetary gear set is connected to the actuator, and
a third element of the third planetary gear set is connected rotationally conjointly to a second element of the first planetary gear set, which in turn is connected rotationally conjointly to the first output shaft.

* * * * *